(12) United States Patent
Park et al.

(10) Patent No.: US 12,719,975 B2
(45) Date of Patent: Aug. 25, 2026

(54) ELECTRONIC DEVICE COMPRISING DRIVE MOTOR

(71) Applicant: SAMSUNG ELECTRONICS CO., LTD., Suwon-si (KR)

(72) Inventors: Sanghyuk Park, Suwon-si (KR); Hyunsuk Kim, Suwon-si (KR); Soohyun Seo, Suwon-si (KR); Wonho Lee, Suwon-si (KR); Joongyeon Cho, Suwon-si (KR); Nakhyun Choi, Suwon-si (KR); Junghyeob Lee, Suwon-si (KR); Hyunju Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 253 days.

(21) Appl. No.: 18/746,875

(22) Filed: Jun. 18, 2024

(65) Prior Publication Data

US 2024/0340367 A1 Oct. 10, 2024

Related U.S. Application Data

(63) Continuation of application No. PCT/KR2023/002374, filed on Feb. 20, 2023.

(30) Foreign Application Priority Data

Mar. 11, 2022 (KR) ........................ 10-2022-0030574
Jul. 4, 2022 (KR) ........................ 10-2022-0082103

(51) Int. Cl.
*H04M 1/02* (2006.01)
*H01Q 1/24* (2006.01)

(52) U.S. Cl.
CPC .......... *H04M 1/0268* (2013.01); *H01Q 1/243* (2013.01); *H04M 1/0237* (2013.01); *H04M 1/0262* (2013.01); *H04M 1/0277* (2013.01)

(58) Field of Classification Search
CPC ............. H04M 1/0268; H04M 1/0237; H04M 1/0262; H04M 1/0277; H01Q 1/243;
(Continued)

(56) References Cited

U.S. PATENT DOCUMENTS 10,747,269 B1 8/2020 Choi et al.
12,200,350 B2 * 1/2025 Ku ........................ G06F 1/1686
(Continued)

FOREIGN PATENT DOCUMENTS

CN 110324056 10/2019
CN 112882540 6/2021
(Continued)

OTHER PUBLICATIONS

Search Report dated Jun. 1, 2023 in International Application No. PCT/KR/2023002374 and English-language translation.
(Continued)

*Primary Examiner* — Fayyaz Alam
(74) *Attorney, Agent, or Firm* — Nixon & Vanderhye, P.C.

(57) ABSTRACT

According to various embodiments, an electronic device may include a first housing; a second housing slidably coupled to the first housing; a rollable display that is disposed to be supported by the first housing and the second housing; a support member disposed on the rear surface of the rollable display; a first printed circuit board disposed on the first housing; a second printed circuit board disposed on the second housing; a flexible printed circuit board that connects the first printed circuit board and the second printed circuit; a driving motor disposed on the second housing and providing a driving force to drive the second housing; a battery disposed on the second housing and supplying power to the driving motor; a pinion gear disposed on the second housing and transmitting power based
(Continued)

on the driving force of the driving motor; and a rack gear disposed on the first housing and gear-coupled with the pinion gear.

15 Claims, 19 Drawing Sheets

(58) Field of Classification Search
CPC .... G06F 1/1681; G06F 1/1624; G06F 1/1635; G06F 1/1652; H05K 1/189
See application file for complete search history.

(56) References Cited

U.S. PATENT DOCUMENTS

| | | | | |
|---|---|---|---|---|
| 12,602,075 | B2 * | 4/2026 | Jin | G06F 1/1616 |
| 2014/0211399 | A1 | 7/2014 | O'Brien | |
| 2020/0033913 | A1 * | 1/2020 | Yang | H04M 1/0268 |
| 2020/0267247 | A1 | 8/2020 | Song et al. | |
| 2020/0363841 | A1 | 11/2020 | Kim et al. | |
| 2021/0099557 | A1 | 4/2021 | Cha et al. | |
| 2021/0135492 | A1 * | 5/2021 | Kim | H02J 7/02 |
| 2022/0019260 | A1 | 1/2022 | Kang et al. | |
| 2022/0019261 | A1 | 1/2022 | Kang et al. | |
| 2022/0346224 | A1 | 10/2022 | Lee et al. | |
| 2023/0396698 | A1 | 12/2023 | Kim et al. | |

FOREIGN PATENT DOCUMENTS

| | | | |
|---|---|---|---|
| CN | 215068990 U | 12/2021 | |
| EP | 4 280 028 | 11/2023 | |
| JP | 2004-207447 | 7/2004 | |
| KR | 10-2011-0082943 | 7/2011 | |
| KR | 10-1107127 | 1/2012 | |
| KR | 10-2019-0062855 | 6/2019 | |
| KR | 10-2020-0117741 | 10/2020 | |
| KR | 10-2281347 | 7/2021 | |
| KR | 10-2021-0118850 | 10/2021 | |
| KR | 10-2021-0148396 | 12/2021 | |
| KR | 10-2022-0008714 | 1/2022 | |
| KR | 10-2022-0008723 | 1/2022 | |
| KR | 10-2022-0012028 | 2/2022 | |
| WO | WO-2019194520 A1 * | 10/2019 | H05K 1/18 |
| WO | 2021/121118 | 6/2021 | |
| WO | 2021/201309 | 10/2021 | |

OTHER PUBLICATIONS

Written Opinion dated Jun. 1, 2023 in International Agilication No. PCT/KR/2023002374.

Extended Search Report datedMay 13, 2024 in European Patent Application No. 23705982.8.

* cited by examiner 200
210
211
212
212a
213
2112
2113
2112a
203
251
253
226
225
225a
2251
2252
2253
220
221
222
223
224
224a
216
218
207
208
2212
2201
2213
252
B
230
240
260
261
x
-x
y
-y
z
-z 200
210
211
210a
210c
2113
2272
227
A
212
253a
253
251a
251
2271
2112a
210b
203
2112
2111
x
y
z 200
220
223
221
207
230
2101
226
240
213
211
210
226
2411
2261
230
240
241
x
y
z
①
②

FIG. 11A 2252
225a
2253
225
2251
2222
2221
2223
②
①
222
220
221

ELECTRONIC DEVICE COMPRISING DRIVE MOTOR

CROSS-REFERENCE TO RELATED APPLICATIONS

This application is a continuation application of International Application No. PCT/KR2023/002374 designating the United States, filed on Feb. 20, 2023, in the Korean Intellectual Property Receiving Office and claiming priority to Korean Patent Application No. 10-2022-0030574, filed on Mar. 11, 2022, and of a Korean patent application number 10-2022-0082103, filed on Jul. 4, 2022, in the Korean Intellectual Property Office, the disclosure of each of which is incorporated by reference herein in its entirety.

TECHNICAL FIELD

Various embodiments of the present disclosure relate to an electronic device including a driving motor.

BACKGROUND ART

Electronic devices are gradually becoming slimmer, rigidity is increasing, design aspects are being strengthened, and at the same time functional elements are being developed to be differentiated. Electronic devices are moving away from uniform rectangular shapes and gradually being transformed into a variety of shapes. The electronic device may have a deformable structure capable of using a large screen display while being convenient to carry. The electronic device may have a structure (e.g., a rollable structure or a slidable structure) capable of varying a display area of a rollable display (e.g., a flexible display) through support of housings that slide with respect to each other. Such an electronic device may include a drive module (e.g., a driving motor) capable of automatically sliding another housing based on one housing.

DISCLOSURE OF INVENTION

Technical Problem

An electronic device may include a rollable electronic device (e.g., a slidable electronic device) in which the display area of the rollable display (e.g., a flexible display) can be expanded and/or reduced. The rollable electronic device may include a first housing and a second housing that are flexibly coupled to each other in an at least partially fitted together manner. For example, the first housing and the second housing may operate to be slidable with respect to each other and support at least a portion of a rollable display (e.g., a flexible display, an expandable display, or a stretchable display) so that in a slide-in state the rollable display may be induced to have a first display area and in a slide-out state it may be induced to have a second display area larger than the first display area.

The electronic device may be disposed between the first housing and the second housing, and it may include a manual slide module (e.g., a spring hinge module) in which the electronic device changes semi-automatically to a slide-in state or a slide-out state in the case of pressing in a direction to close or open above a certain inflection point. However, the manual sliding structure may interfere with the smooth sliding operation because of the repulsive force of the rollable display to unfold, and it may be difficult to design so that the sliding operation is performed by distributing uniformly the repulsive force of the rollable display and the elastic force of the manual slide module (e.g., the spring hinge).

To resolve this difficulty, the electronic device may include a driving module that includes a driving motor including a pinion gear that is disposed in an inner space and enables the second housing to slide automatically based on the first housing gripped by the user, and a rack gear that is gear-coupled with the pinion gear. In the case that the driving motor is driven and the gearing operation is performed while the pinion gear and the rack gear are gear-coupled, the electronic device may automatically perform the sliding operation.

However, the situation is that, in the rollable electronic device, a structure in which the slide stroke is relatively extended in electronic devices having the same size or the efficient disposition design of a driving motor through an efficient electrical connection relationship between the driving motor and the rest of the electronic components has not been considered.

Various embodiments of the present disclosure may provide an electronic device including a driving motor disposed to induce a relatively extended slide stroke.

Various embodiments may provide an electronic device including a driving motor disposed to induce a minimization of an electrical connection structure.

Various embodiments may provide a rollable electronic device provided with a support structure for supporting a rollable display in a slide-out state.

However, the problem to be solved in the present disclosure is not limited to the above-mentioned problems and may be expanded in various ways without departing from the spirit and scope of the present disclosure.

Solution to Problem

According to various embodiments, an electronic device may include a first housing; a second housing slidably coupled to the first housing; a rollable display that is disposed to be supported by the first housing and the second housing and of which a display area is reduced or expanded based on slide-in or slide-out of the second housing; a support member disposed on the rear surface of the rollable display to support at least a portion of the rollable display; a first printed circuit board disposed on the first housing; a second printed circuit board disposed on the second housing; a flexible printed circuit board that is configured to connect the first printed circuit board and the second printed circuit and is folded or unfolded based on the slide-in or the slide-out of the second housing; a driving motor disposed on the second housing and configured to provide the driving force to drive the second housing; a battery disposed on the second housing and configured to supply the power to the driving motor; a pinion gear disposed on the second housing and configured to transmit power based on the driving force of the driving motor; and a rack gear disposed on the first housing and gear-coupled with the pinion gear.

According to various embodiments, an electronic device may include a first housing including a first space formed through a first lateral member and a first printed circuit board disposed in the first space; a second housing slidably coupled to the first housing and including a second printed circuit board disposed in a second space formed through a second lateral member; a rear surface cover disposed on an outer surface of the first lateral member; at least one electronic component disposed between the first lateral member and the rear surface cover; a rollable display that is disposed to be supported by the first housing and the second housing and of whicha display area is expanded in the case of transitioning from a slide-in state where at least a portion of the second housing is accommodated in the first space to a slide-out state where moving in a first direction, wherein the first direction is a direction in which the display area is expanded; a driving motor disposed on the second space, connected electrically to at least one electronic component and including a pinion gear; and a rack gear disposed on the first space and gear-coupled with the pinion gear, wherein at least one electronic component may be connected electrically to the second printed circuit board through an expandable flexible printed circuit board that is extended to the second space from the first printed circuit board.

According to various embodiments, an electronic device may include a first housing including a first space in which a first extension member is disposed; a second housing slidably coupled to the first housing and including a second space; a support bracket disposed in the first space; a rollable display that is disposed to be supported by the first housing and the second housing and of which a display area is expanded in the case of transitioning from a slide-in state where at least a portion of the second housing is accommodated in the first space to a slide-out state where moving in a first direction, wherein the first direction is a direction in which the display area is expanded; at least one electronic component disposed in the second space; a driving motor disposed on the second space, connected electrically to at least one electronic component and including a pinion gear; and a rack gear disposed on the first space and gear-coupled with the pinion gear, wherein the support bracket includes a support part of which the outer surface is formed in curve to support at least a portion of the support member and a support plate extending from the support part toward the second housing, and wherein the support plate is formed to support at least a portion of the support member in the slide-out state.

According to various embodiments, an electronic device may include a first housing including a first lateral member and a first extension member extending from the first lateral member to a first space; a second housing slidably coupled to the first housing and including a second lateral member and a second extension member extending from the second lateral member to a second space; a rollable display that is disposed to be supported by the first housing and the second housing and of which a display area is expanded in the case of transitioning from a slide-in state where at least a portion of the second housing is accommodated in the first space to a slide-out state where moving in a first direction, wherein the first direction is a direction in which the display area is expanded; at least one electronic component disposed in the second space; a driving motor disposed on at least a portion of the second extension member, connected electrically to at least one electronic component and including a pinion gear; and a rack gear disposed through the first extension member and gear-coupled with the pinion gear, wherein the driving motor may be disposed at an edge of the first extension member in a direction opposite to the first direction.

Advantageous Effects of Invention

An electronic device according to exemplary embodiments of the present disclosure may provide an extended slide stroke corresponding to the length of a rack gear by including the rack gear disposed to be gear-coupled with a pinion gear of a driving motor in an inner space of a second housing that slides with respect to a first housing and in an inner space of a driving motor and the first housing disposed at an end in a slide-in direction.

In addition, the electronic device may provide an efficient electrical connection structure with the driving motor by including electronic components (e.g., a board or a battery) disposed together with the driving motor in the inner space of the second housing.

In addition, the electronic device may help improve the operational reliability of the electronic device by including a support structure disposed in an inner space of the first housing to support at least a portion of the rollable display in a slide-out state.

In addition to this, various effects identified directly or indirectly through this document may be provided.

BRIEF DESCRIPTION OF DRAWINGS

In connection with the description of the drawings, the same or similar reference numerals may be used for the same or similar components.

FIGS. 11A and 11B are diagrams illustrating a support structure for a rollable display according to various embodiments of the present disclosure.

MODE FOR THE INVENTION

Figure 1:
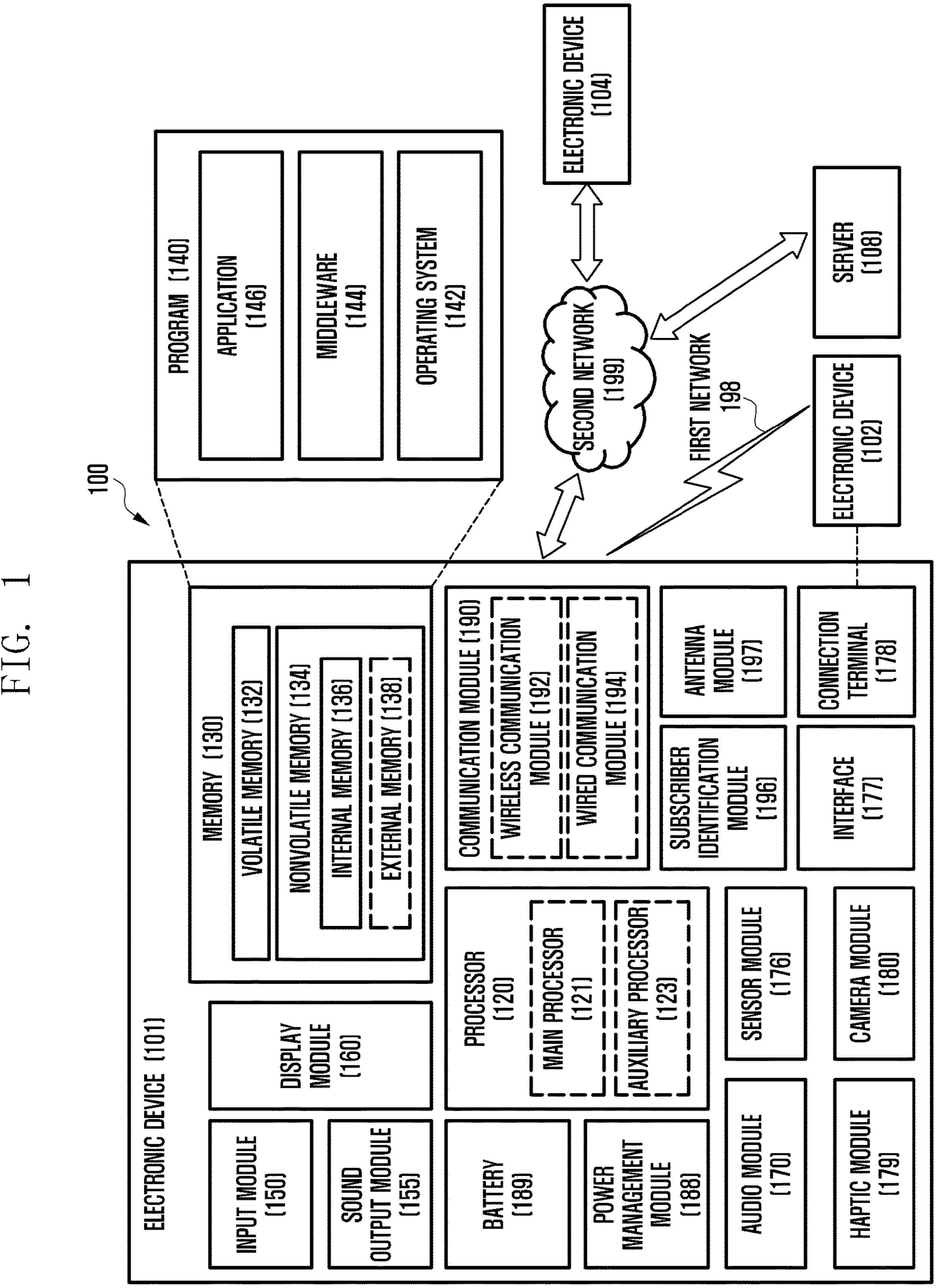
FIG. 1 illustrates a block diagram of an electronic device in a network environment according to various embodiments of the present disclosure.

FIG. 1 is a block diagram illustrating an electronic device 101 in a network environment 100 according to various embodiments.

With reference to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, For example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, For example, software (e.g., the program 140) and input data or output data for a command related thereto. The memory 130 may include the volatile memory 132 or the non-volatile memory 134.

The program 140 may be stored in the memory 130 as software, and may include, For example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, For example, a microphone, a mouse, a keyboard, a key (e.g., a button), or a digital pen (e.g., a stylus pen).

The sound output module 155 may output sound signals to the outside of the electronic device 101. The sound output module 155 may include, For example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, For example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, For example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, For example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, For example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, For example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, For example, a power management integrated circuit (PMIC).

The battery 189 may supply power to at least one component of the electronic device 101. According to an embodiment, the battery 189 may include, For example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (cMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, For example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a lateral) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, For example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) on the basis of 5G communication technology or IoT-related technology.

Figure 2A:
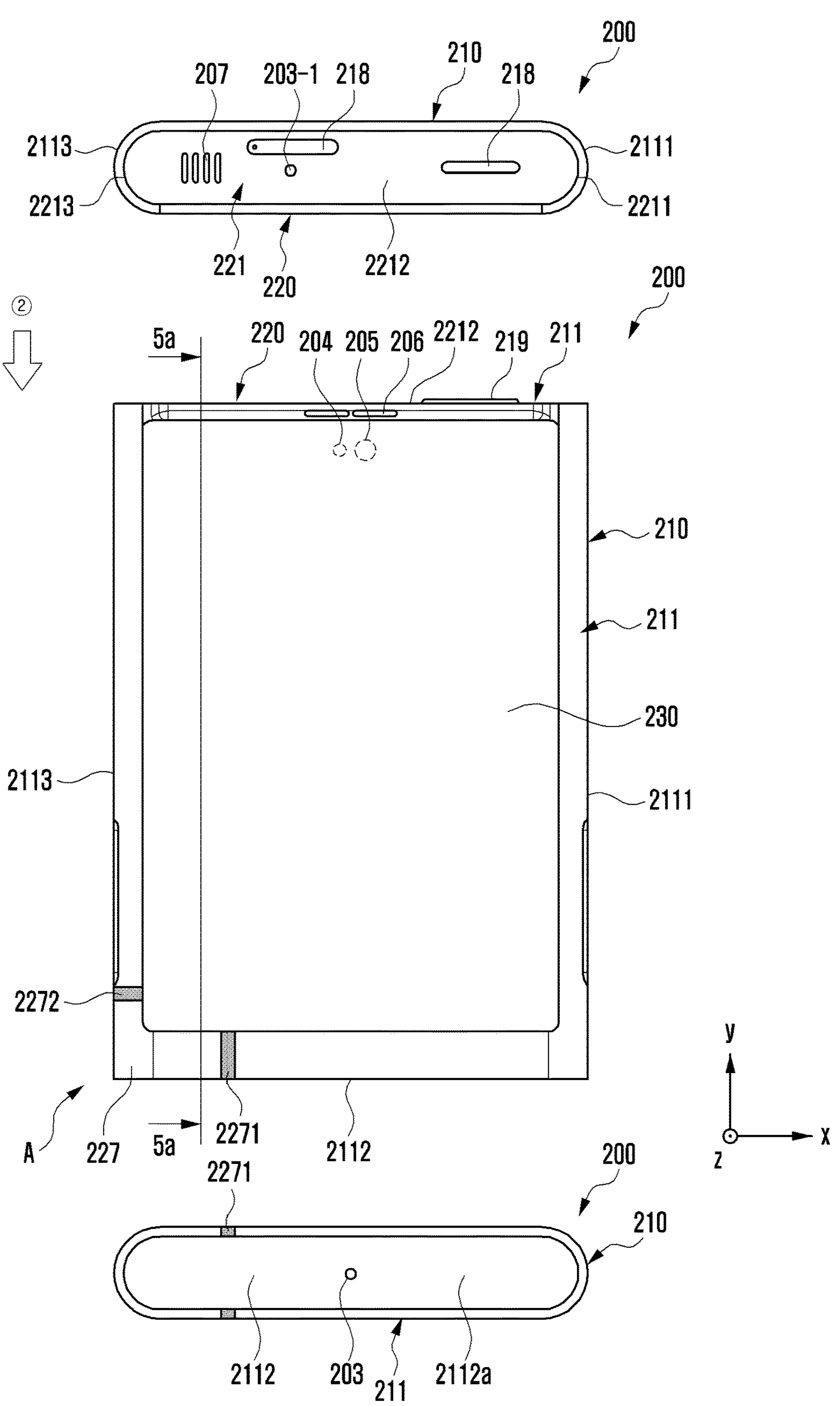
FIGS. 2A and 2B are diagrams illustrating front and rear views of an electronic device in a slide-in state according to various embodiments of the present disclosure.

According to various embodiments, the sensor module 176 may include a movement distance detection sensor for detecting a movement distance from the second housing (e.g., the second housing 220 of FIG. 2A) of the electronic device (e.g., the electronic device 200 of FIG. 2A) to the first housing (e.g., the first housing 210 of FIG. 2A). According to an embodiment, the processor 120 may control the display module 160 to detect the movement distance in real time through the sensor module 160 while the first housing 210 is moved from the second housing 220 and to display an object corresponding to the varying display areas through a display (e.g., the rollable display 230 of FIG. 2A). According to an embodiment, the electronic device 101 may include a driving motor control module to control the operation of the driving motor (e.g., the driving motor 260 of FIG. 4) disposed inside the electronic device. In some embodiments, the driving motor control module may be replaced by the processor 120.

Figure 2B:
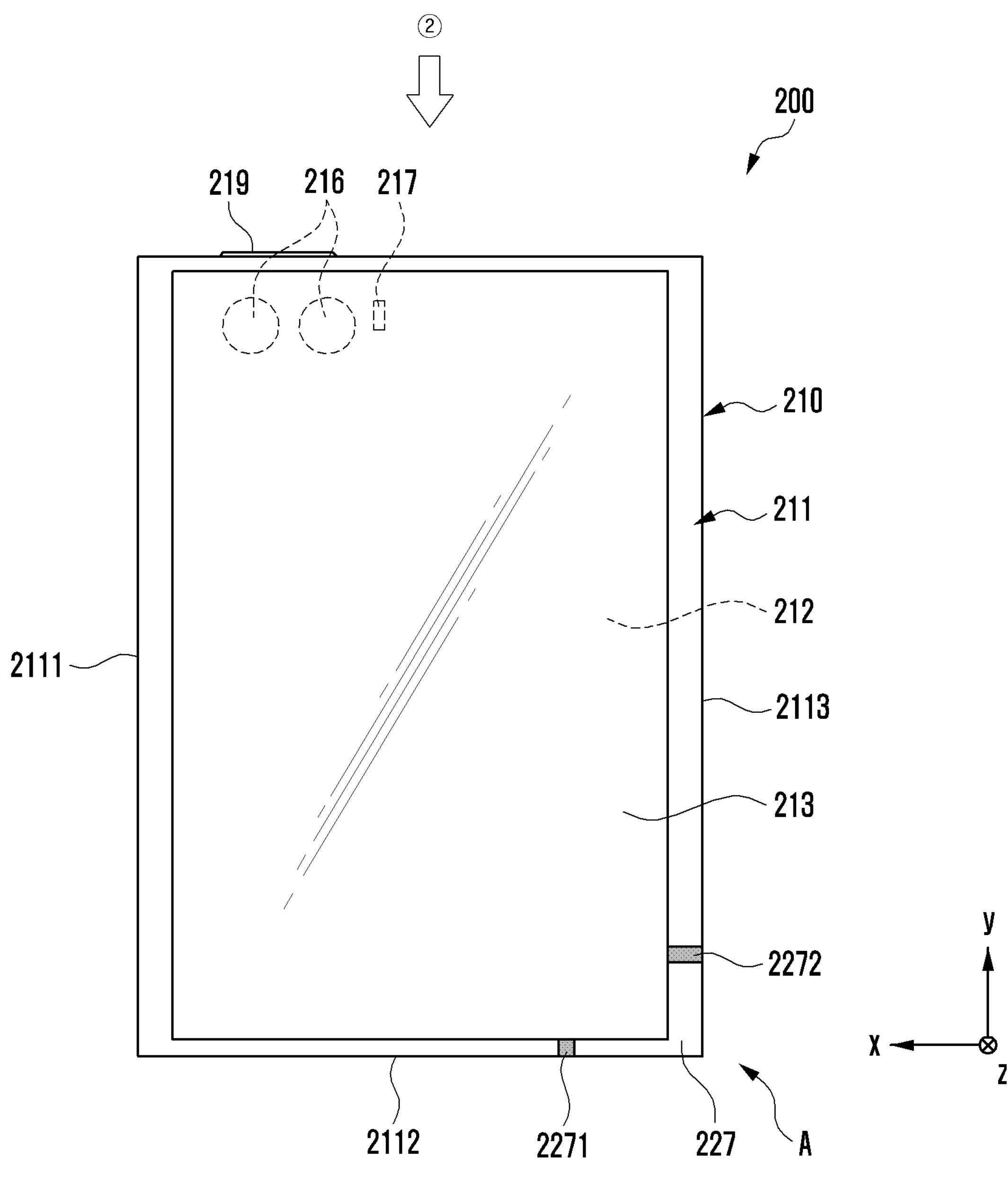
Figure 3A:
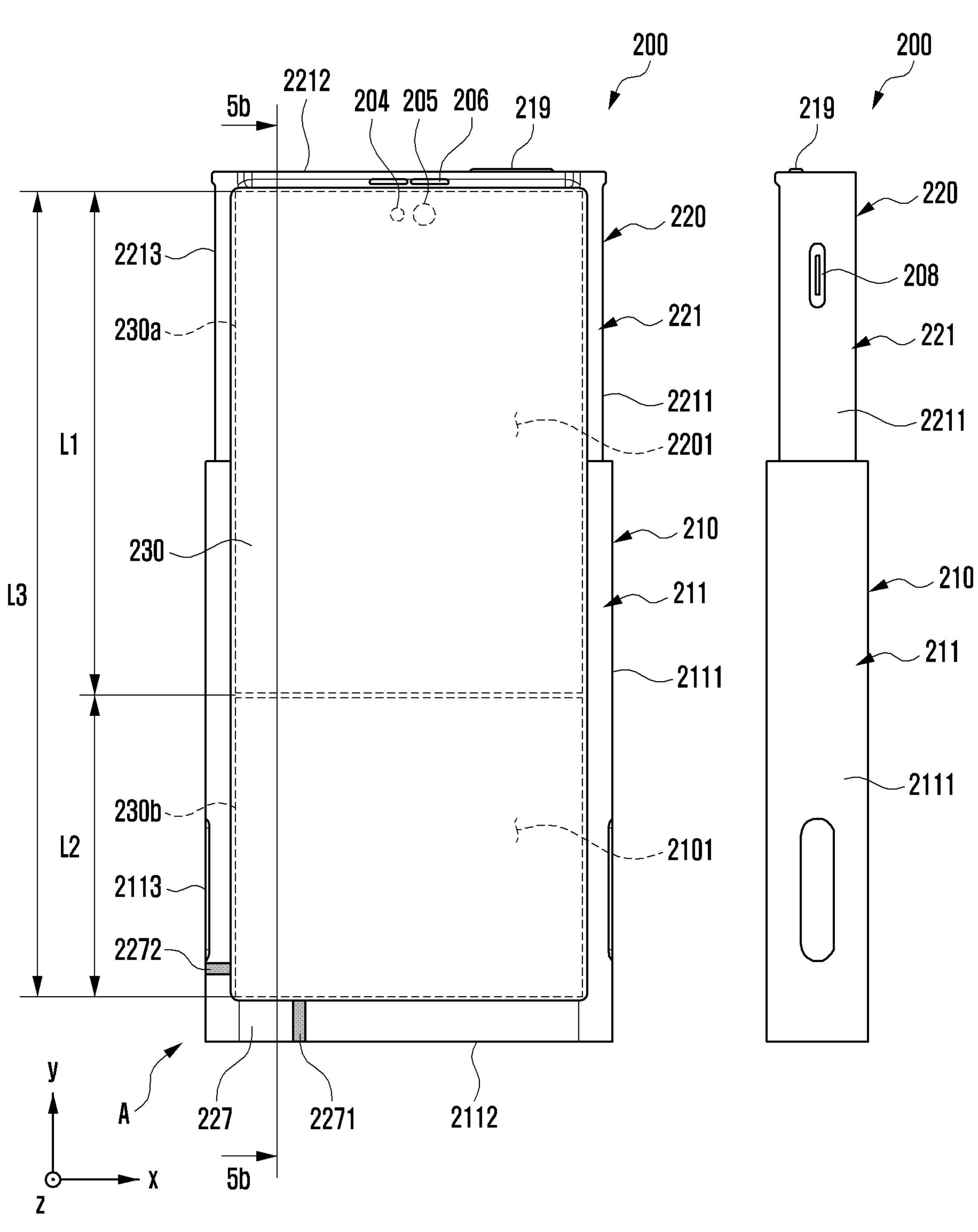
FIGS. 3A and 3B are diagrams illustrating front and rear views of an electronic device in a slide-out state according to various embodiments of the present disclosure.
Figure 3B:
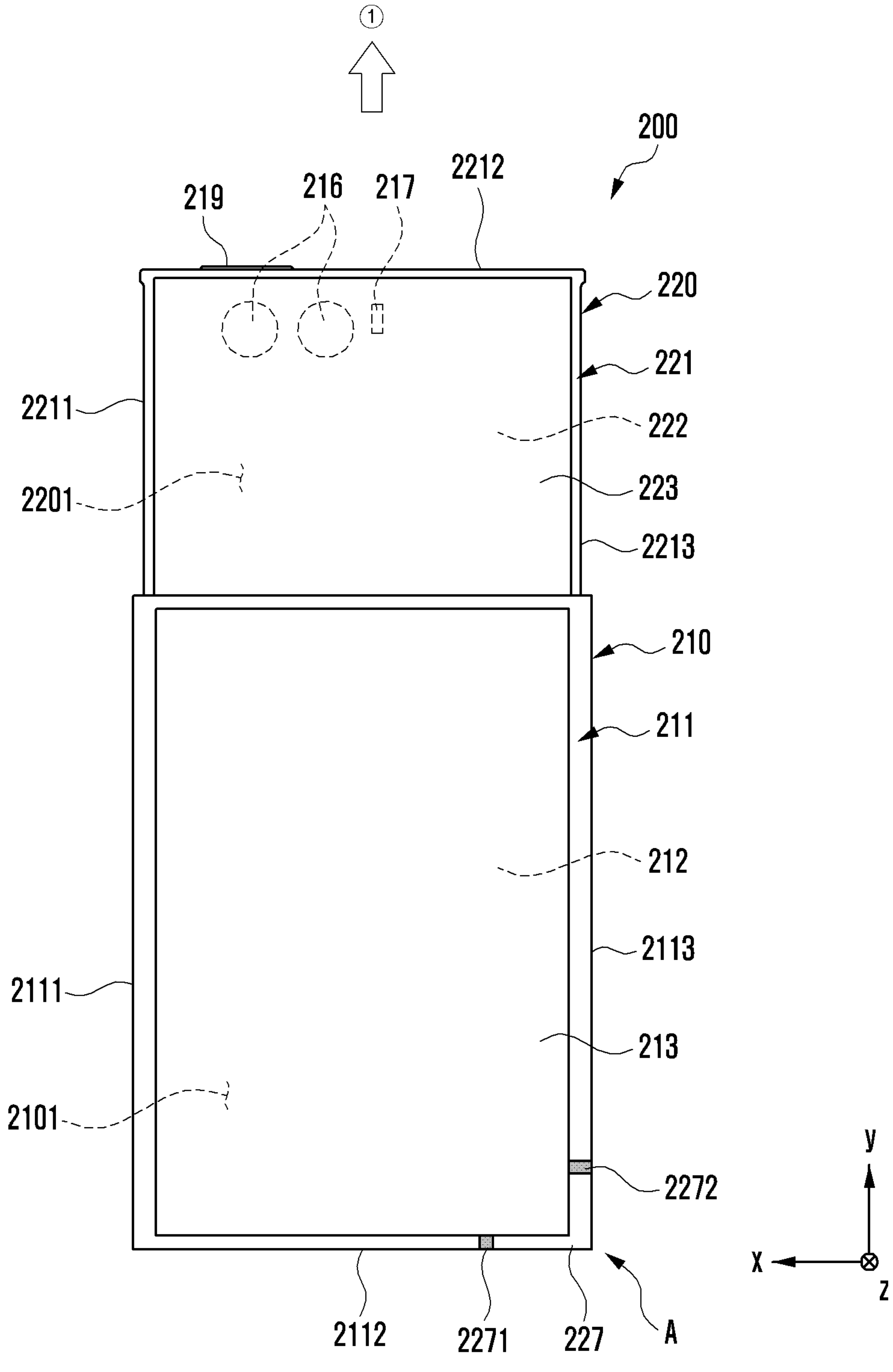

FIGS. 2A and 2B are diagrams illustrating front and rear views of an electronic device in a slide-in state according to various embodiments of the present disclosure. FIGS. 3A and 3B are diagrams illustrating front and rear views of an electronic device in a slide-out state according to various embodiments of the present disclosure.

The electronic device 200 of FIGS. 2A to 3B may be at least partially similar to the electronic device 101 of FIG. 1 or may further include other embodiments of the electronic device.

With reference to FIGS. 2A to 3B, the electronic device 200 may include a first housing 210; a second housing 220 coupled to the first housing 210 so that it can slide from the first housing 210 in a designated direction (e.g., direction ①) or direction ② (e.g., ±y-axis direction); and a rollable display 230 (e.g., a flexible display, an expandable display or a stretchable display) disposed to be supported through at least a portion of the first housing 210 and the second housing 220. In the description and the accompanying drawings, the term "direction ①" or "①" may be understood or interpreted as a direction in which a display area of the rollable display 230 is expanded, and the term "direction ②" or "②" may be understood or interpreted as i) a direction in which a display area of the rollable display 230 is reduced or ii) a direction opposite to the direction ①. According to an embodiment, the electronic device 200 may be configured to slide out the second housing 220 in a first direction (direction ①) based on the first housing 210 gripped by the user, or slide in the second housing 220 in a second direction (direction ② opposite to the first direction (direction ①). According to an embodiment, the electronic device 200 may be switched to a slide-in state by at least a portion of the second housing 220 including the second space 2201 being accommodated in the first space 2101 of the first housing 210. According to an embodiment, the electronic device 200 may include a support member (e.g., the support member 240 of FIG. 4) (e.g., a bendable member, an articulated hinge module, or a multi-bar assembly) forming at least partially the same plane as at least a portion of the second housing 220 in a slide-out state and being accommodated at least partially in the first space 2101 of the first housing 210 in a slide-in state. According to an embodiment, at least a portion of the rollable display 230 may be disposed invisible from the outside in a slide-in state by being supported by a support member (e.g., the support member 240 of FIG. 4) and being accommodated in the first space 2101 of the first housing 210. According to an embodiment, at least a portion of the rollable display 230 may be disposed to be visible from the outside in a slide-out state by being supported by a support member (e.g., the support member 240 of FIG. 4) forming at least partially the same plane as at least a portion of the second housing 220 and being accommodated in the first space 2101 in a bent manner.

According to various embodiments, the electronic device 200 may include a first housing 210 that includes a first lateral member 211 and a second housing 220 that includes a second lateral member 221. According to an embodiment, the first lateral member 211 may include a first side surface 2111 having a first length along a first direction (e.g., the y-axis direction); a second side surface 2112 extending to have a second length shorter than the first length along a direction (e.g., the x-axis direction) substantially perpendicular to the first side surface 2111; and a third side surface 2113 extending substantially parallel to the first side surface 2111 from the second side surface 2112 and having the first length. According to an embodiment, the first lateral member 211 may be at least partially formed of a conductive member (e.g., metal). In some embodiments, the first lateral member 211 may be formed by combining a conductive member and a non-conductive member (e.g., polymer). According to an embodiment, the first housing 210 may include a first extension member 212 extending from at least a portion of the first lateral member 211 to at least a portion of the first space 2101. According to an embodiment, the first extension member 212 may be integrally formed with the first lateral member 211. In some embodiments, the first extension member 212 may be formed separately from the first lateral member 211 and structurally combined with the first lateral member 211.

According to various embodiments, the second lateral member 221 may include a fourth side surface 2211 that at least partially corresponds to the first side surface 211 and has a third length; a fifth side surface 2212 that extends substantially parallel to the second side surface 2112 from the fourth side surface 2211 and has a fourth length shorter than the third length; and a sixth side surface 2213 that extends from the fifth side surface 2212 to correspond to the third side surface 2113 and has the third length. According to an embodiment, the second lateral member 221 may be at least partially formed of a conductive member (e.g., metal). In some embodiments, the second lateral member 221 may be formed by combining a conductive member and a non-conductive member (e.g., polymer). According to an embodiment, at least a portion of the second lateral member 221 may include a second extension member 222 extending to at least a portion of the second space 2201 of the second housing 220. According to an embodiment, the second extension member 222 may be integrally formed with the second lateral member 221. In some embodiments, the second extension member 222 may be formed separately from the second lateral member 221 and structurally combined with the second lateral member 221.

According to various embodiments, the first side surface 2111 and the fourth side surface 2211 may be slidably coupled to each other. According to an embodiment, the third side surface 2113 and the sixth side surface 2213 may be slidably coupled to each other. According to an embodiment, in the slide-in state, the fourth side surface 2211 may be disposed to be substantially invisible from the outside by being overlapped with the first side surface 2111. According to an embodiment, in the slide-in state, the sixth side surface 2213 may be disposed to be substantially invisible from the outside by being overlapped with the third side surface 2113. In some embodiments, at least a portion of the fourth side surface 2211 and the sixth side surface 2213 may be disposed to be at least partially visible from the outside in a slide-in state. According to an embodiment, in the slide-in state, the second extension member 222 may be disposed to be substantially invisible from the outside by being overlapped with the first extension member 212.

According to various embodiments, the first housing 210 may include a first rear surface cover 213 coupled to at least a portion of the first lateral member 211. According to an embodiment, the first rear surface cover 213 may be disposed in a manner coupled with at least a portion of the first extension member 212. In some embodiments, the first rear surface cover 213 may be integrally formed with the first lateral member 211. According to an embodiment, the first rear surface cover 213 may be formed of polymer, coated or tinted glass, ceramic, metal (e.g., aluminum, stainless steel (STS), or magnesium), or a combination of at least two of these materials. In some embodiments, the first rear surface cover 213 may be extended to at least a portion of the first lateral member 211. In some embodiments, at least a portion of the first extension member 212 may be replaced with the first rear surface cover 213.

According to various embodiments, the second housing 220 may include a second rear surface cover 223 coupled to at least a portion of the second lateral member 221. According to an embodiment, the second rear surface cover 223 may be disposed in a manner in which it is coupled with at least a portion of the second extension member 222. In some embodiments, the second rear surface cover 223 may be integrally formed with the second lateral member 221. According to an embodiment, the second rear surface cover 223 may be formed of polymer, coated or tinted glass, ceramic, metal (e.g., aluminum, stainless steel (STS), or magnesium), or a combination of at least two of these materials. In some embodiments, the second rear surface cover 223 may be extended to at least a portion of the second lateral member 221. In some embodiments, at least a portion of the second extension member 222 may be replaced with a second rear surface cover 223.

According to various embodiments, the electronic device 200 may include a rollable display 230 disposed to be supported by at least a portion of the first housing 210 and the second housing 220. According to an embodiment, the rollable display 230 may include a first portion **230*a* (e.g., a flat portion) that is always visible from the outside and a second portion 230*b* (e.g., a bendable portion) that extends from the first portion 230*a* and is at least partially accommodated in the first space 2101 of the first housing 210 to be invisible from the outside in a slide-in state. According to an embodiment, the first portion 230*a* may be disposed to be supported by the second housing 220, and the second portion 230*b* may be at least partially supported by a support member (e.g., the support member 240 of FIG. 4). According to an embodiment, the second portion 230*b* of the rollable display 230 may be disposed so that it can extend from the first portion 230*a* while being supported by the support member (e.g., the support member 240 of FIG. 4), form substantially the same plane as the first portion 230*a*, and be visible from the outside in a state that the second housing 220** slides out along the first direction (direction ①.

According to an embodiment, the second portion **230*b* of the rollable display 230 may be disposed so that it can be accommodated in a manner of being bent into a first space 2101 of the first housing 210 and be invisible from the outside in a state that the second housing 220 slides in along the second direction (direction ②. Accordingly, the electronic device 200 may vary the display area of the rollable display in accordance with the second housing 220 moving in a sliding manner along a designated direction (e.g., the +y-axis direction) from the first housing 210**.

According to various embodiments, the rollable display 230 may vary the length in a first direction (direction ①) in accordance with the sliding movement of the second housing 220 moving relative to the first housing 210. For example, in the slide-in state, the rollable display 230 may have a first display area (e.g., an area corresponding to the first portion **230*a*) corresponding to the first length L1. According to an embodiment, in the slide-out state, the rollable display 230 may be extended to correspond to the third length L3 longer than the first length L1 and have the third display area (e.g., the area including the first portion 230*a* and the second portion 230*b*) larger than the first display area in accordance with the sliding movement of the second housing 220 additionally moved by a second length L2 relative to the first housing 210**.

According to various embodiments, the electronic device 200 may include at least one of an input device (e.g., a microphone 203-1) disposed in the second space 2201 of the second housing 220, an audio output device (e.g., a receiver 206 and/or a speaker 207 for a call), a sensor module 204 and 217, a camera module (e.g., a first camera module 205 or a second camera module 216), a connector port 208, a key input device 219, or an indicator (not shown). According to an embodiment, the electronic device 200 may include another input device (e.g., a microphone 203) disposed in the first housing 210. In another embodiment, the electronic device 200 may be configured so that at least one of the above-described components is omitted or other components are additionally included. In another embodiment, at least one of the above-described components may be disposed in the first space 2101 of the first housing 210.

According to various embodiments, the input device may include a microphone 203-1. In some embodiments, the input device (e.g., the microphone 203-1) may include a plurality of microphones disposed to detect the direction of sound. The audio output device may include, for example, a receiver 206 and a speaker 207 for a call. According to an embodiment, the speaker 207 may correspond to the outside through at least one speaker hole formed in the second housing 220 in a position always exposed to the outside regardless of the slide-in/the slide-out state (e.g., the fifth side surface 2212). According to an embodiment, the connector port 208 may correspond to the outside through a connector port hole formed in the second housing 220 in a slide-out state. In some embodiments, the connector port 208 may correspond to the outside through an opening formed in the first housing 210 and formed to correspond to the connector port hole. In some embodiments, the receiver 206 for a call may include a speaker (e.g., a piezo speaker) operating while excluding a separate speaker hole.

According to various embodiments, the sensor modules 204 and 217 may generate electrical signals or data values corresponding to an internal operating state of the electronic device 200 or an external environmental state. The sensor modules 204 and 217 may include, for example, the first sensor module 204 (e.g., a proximity sensor or an illuminance sensor) disposed on the front side of the electronic device 200 and/or the second sensor module 217 (e.g., a heart rate monitoring (HRM) sensor) disposed on the rear surface of the electronic device 200. According to an embodiment, the first sensor module 204 may be disposed below the rollable display 230 on the front side of the electronic device 200. According to an embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, an air pressure sensor, a magnetic sensor, an acceleration sensor, a grip sensor, a color sensor, an infrared (IR) sensor, a bio sensor, a temperature sensor, or a humidity sensor.

According to various embodiments, the camera module may include a first camera module 205 disposed on the front side of the electronic device 200 and a second camera module 216 disposed on the rear surface of the electronic device 200. According to an embodiment, the electronic device 200 may include a flash (not shown) located near the second camera module 216. According to an embodiment, the camera modules 205 and 216 may include one or a plurality of lenses, an image sensor, and/or an image signal processor. According to an embodiment, the first camera module 205 may be disposed under the rollable display 230 and be configured to photograph a subject through a part of an active area (e.g., a display area) of the rollable display 230.

According to various embodiments, the first camera module 205 among the camera modules and part of sensor module 204 among the sensor modules 204 and 217 may be disposed to detect the external environment through the rollable display 230. For example, the first camera module 205 or part of the sensor module 204 may be disposed in the second space 2201 of the second housing 220 to be in contact with the external environment through a transparent area or a perforated opening formed in the rollable display 230. According to an embodiment, an area facing the first camera module 205 of the rollable display 230 may be formed as a transmissive area having a designated transmittance as a part of a display area displaying content. According to an embodiment, the transmissive area may be formed to have a transmittance in a range of about 5% to about 20%. Such a transmissive area may include an area overlapping an effective area (e.g., an angle of view area) of the first camera module 205 through which light for generating an image formed by an image sensor passes. For example, the transmissive area of the rollable display 230 may include an area in which a pixel arrangement density and/or a wiring density are lower than the surrounding area. For example, a transmissive area may replace the aforementioned opening. For example, some types of camera module 205 may include an under display camera (UDC). In some embodiments, some types of sensor module 204 may be disposed to perform their function in the inner space of the electronic device 200 without being visually exposed through the rollable display 230.

According to various embodiments, the electronic device 200 may include at least one antenna (e.g., the antenna 224*b* of FIG. 10) electrically connected to the wireless communication circuit (e.g., the wireless communication module 192 of FIG. 1) disposed in the second housing 220. In some embodiments, the wireless communication circuit may be disposed in the first space 2101 of the first housing 210. According to an embodiment, the electronic device 200 may include a bezel antenna A disposed through the conductive first lateral member 211 of the first housing 210. For example, the bezel antenna A may be disposed on at least a portion of the second side surface 2112 and the third side surface 2113 of the first lateral member 211, and it may include a conductive portion 227 electrically segmented through at least one segmentation portion 2271 and 2272 formed of a non-conductive material (e.g., polymer). According to an embodiment, the wireless communication circuit (e.g., the wireless communication module 192 of FIG. 1) may be configured to transmit or receive the wireless signal in at least one frequency band (e.g., about 600 MHz to 9000 MHz) (e.g., the legacy band or NR band) designated through the conductive part 227. According to an embodiment, the electronic device 200 may include a side surface cover 2112*a* disposed on the second side surface 2112 to cover at least a portion of the at least one segmentation portion 2271. In some embodiments, the bezel antenna A may be disposed on at least one side surface among the first side surface 2111, the second side surface 2112, and the third side surface 2113. In some embodiments, the bezel antenna A may be disposed on at least one side surface among the fourth side surface 2211, the fifth side surface 2212, and the sixth side surface 2213 of the second housing 220. In some embodiments, the electronic device 200 may be disposed in an inner space (e.g., the first space 2101 or the second space 2201), and it may include further at least one antenna module (e.g., a 5G antenna module or an antenna structure) disposed to transmit or receive the wireless signal in a frequency band ranging from 3 GHz to 100 GHz through another wireless communication circuit (e.g., the wireless communication module 192 of FIG. 1).

According to various embodiments, a slide-in/a slide-out operation of the electronic device 200 may be automatically performed. For example, the slide-in/the slide-out operation of the electronic device 200 may be performed through gear-coupling of a driving motor (e.g., the driving motor 260 of FIG. 4) including a pinion gear (e.g., the pinion gear 261 of FIG. 6A) disposed in the second space 2201 of the second housing 220, with a rack gear (e.g., the rack gear 2251 of FIG. 4) disposed in the first space 2101 of the first housing 210 and gear-coupled with the pinion gear 261. For example, the processor (e.g., processor 120 of FIG. 1) of the electronic device 200 may operate a driving motor (e.g., the driving motor 260 of FIG. 4) disposed inside the electronic device 200 in the case of detecting a triggering operation to switch from a slide-in state to a slide-out state or to switch from a slide-out state to a slide-in state. According to an embodiment, the triggering operation may include selecting (e.g., touching) an object displayed on the rollable display 230 or manipulating a physical button (e.g., a key button) included in the electronic device 200.

The electronic device 200 according to exemplary embodiments of the present disclosure may provide an extended sliding stroke by having a moving design structure (e.g., a structure in which the driving motor 260 is disposed at the lower end of the second housing 220 in a slide-in state) through a driving motor (e.g., the driving motor 260 of FIG. 4) being disposed at the end (e.g., the lower end (edge area) of the second housing 210 in the slide-in state) in the slide-in direction (direction ② in the second space 2201 of the second housing 220 and the pinion gear (e.g., the pinion gear 261 of FIG. 6*a*) of the driving motor 260 being gear-coupled with the rack gear (e.g., the rack gear 2251 of FIG. 4) disposed corresponding to the first space 2101 of the first housing 210. In addition, the electronic device 200 may provide an efficient electrical connection structure with the driving motor 260 by including electronic components (e.g., a board or a battery) disposed together with the driving motor 260 in the second space 2201 of the second housing 220. In addition, the operational reliability of the electronic device 200 may be helped to improve by the inclusion of a support structure disposed in the first space 2101 of the first housing 210 to support at least a portion of the rollable display 230 in a slide-out state. Hereinafter, detailed explanations will be described below.

Figure 4:
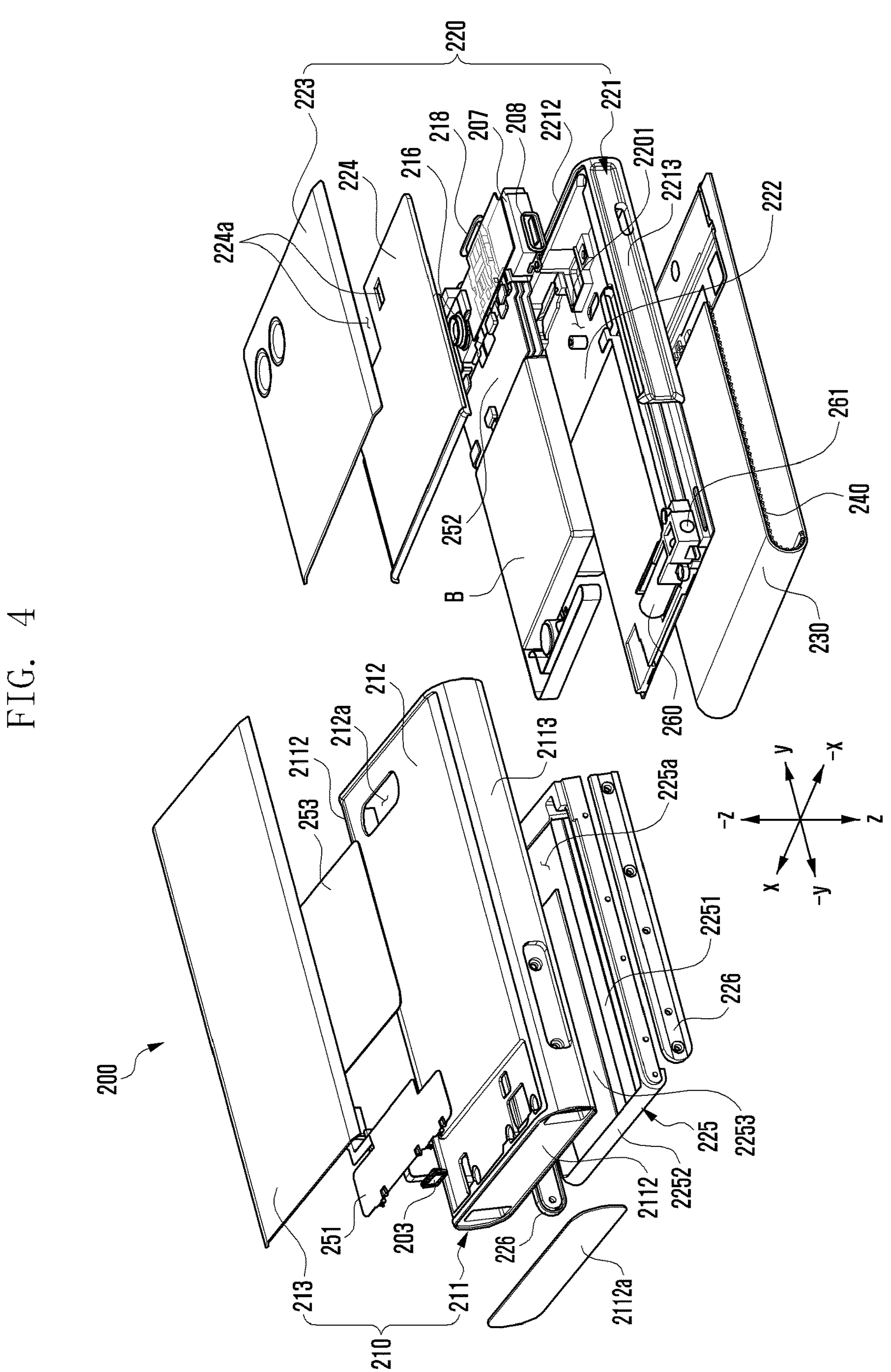
FIG. 4 illustrates an exploded perspective view of an electronic device according to various embodiments of the present disclosure.

FIG. 4 illustrates an exploded perspective view of an electronic device according to various embodiments of the present disclosure.

In describing the electronic device 200 of FIG. 4, the same reference numerals are assigned to components substantially the same as those of the electronic device 200 of FIGS. 2A to 3B, and detailed descriptions thereof may be omitted.

With reference to FIG. 4, the electronic device 200 may include: a first housing 210 including a first space 2101; a second housing 220 slidably coupled to the first housing 210 and including a second space (e.g., the second space 2201 of FIG. 3A); a support member 240 disposed to be at least partially bendable in the first space 2101; a rollable display 230 disposed to be supported by at least a portion of the support member 240 and the second housing 220; and a driving module driving the second housing 220 in a slide-in direction (e.g., −y axis direction) and/or in a slide-out direction (e.g. y axis direction) from the first housing 210. According to an embodiment, the first housing 210 may include a first lateral member 211 and a first rear surface cover 213 coupled to at least a portion (e.g., at least a portion of the first extension member 212) of the first lateral member 211. According to an embodiment, the second housing 220 may include a second lateral member 221 and a second rear surface cover 223 coupled to at least a portion (e.g., at least a portion of the second extension member 222) of the second lateral member 221. According to an embodiment, the driving module may include a driving motor 260 disposed in the second space 2201 and including a pinion gear (e.g., the pinion gear 261 of FIG. 6A) and a rack gear 2251 disposed to be gear-coupled to the pinion gear 261 in the first space 2101. According to an embodiment, the driving module may further include a deceleration module including a plurality of gear assemblies disposed to reduce rotational speed and increase a driving force by being coupled with the driving motor 260. According to an embodiment, the driving motor 260 may be disposed to be supported through at least a portion of the second extension member 222 in the second space 2201 of the second housing 220. According to an embodiment, the driving motor 260, in the second space 2201, may be fixed in the end (e.g., the edge area) of the second extension member 222 in the slide-in direction (e.g., −y axis direction) in the second space 2201.

According to various embodiments, the electronic device 200 may include at least one electronic component disposed in the first housing 210 and the second housing 220. According to an embodiment, the at least one electronic component may include a first printed circuit board 251 disposed in the first housing 210 and a second printed circuit board 252 disposed in the second housing 220. According to an embodiment, the at least one electronic component may include a camera module 216, a socket module 218 (e.g., an SIM tray), a speaker 207, a connector port 208, and a battery B disposed around the second printed circuit board 251 in the second space 2201. According to an embodiment, an efficient electronic connection may be possible because at least one electronic component is disposed around the second printed circuit board 252 in the second space 2201 of the second housing 220 together with the driving motor 260.

According to various embodiments, the electronic device 200 may include a rear bracket 224 disposed to cover at least a portion of at least one electronic component disposed between the second extension member 222 and the second rear surface cover 223 in the second housing 220. According to an embodiment, the rear bracket 224 may be structurally coupled to at least a portion of the second extension member 222. In some embodiments, the rear bracket 224 may be omitted. According to an embodiment, the rear bracket 224 may cover at least one electronic component and may be disposed to support the second rear surface cover 223. According to an embodiment, the rear bracket 224 may include a notch area 224*a* or an opening 224*a* (e.g., a through hole) of FIG. 10 formed in an area corresponding to the camera module 216 and/or a sensor module (e.g., the sensor module 217 of FIG. 3B). According to an embodiment, the camera module 216 and/or the sensor module 217 may be disposed to detect an external environment through the notch area 224*a* or the opening 224*a* of FIG. 10. According to an embodiment, at least an area corresponding to the camera module 216 and/or the sensor module 217 of the second rear surface cover 223 may be processed to be transparent. In some embodiments, the camera module 216 and/or sensor module 217 may be configured to operate only in the case that the electronic device 200 is in a slide-out state.

According to various embodiments, the electronic device 200 may include a support bracket 225 (e.g., a display support bar (DSB)) of a plate-type disposed in the first space 2101 of the first housing 210 and coupled to at least a portion of the first extension member 212. According to an embodiment, the support bracket 225 may include an opening 225*a* of a designated size as shown in FIGS. 6A, 6B, 7, 11A. According to an embodiment, the support bracket 225 may be disposed at one end and include a support part 2252 of which an outer surface is formed in a curve to support the rear surface of the support member 240 that is bent during a sliding operation. According to an embodiment, the support bracket 225 may include a support plate 2253 formed to support the rear surface of the support member 240 in a slide-out state by extending from at least a portion of the support part 2252 to at least a portion of the opening 225*a*. According to an embodiment, the support bracket 225 may include a rack gear 2251 fixed to cross the opening 225*a* and have a length along a direction parallel to the sliding direction. In some embodiments, the rack gear 2251 may be integrally formed with the support bracket 225. According to an embodiment, the electronic device 200 may include a pair of guide rails 226 to guide both ends of the support member 240 in a sliding direction by being disposed on both sides of the support bracket 225.

According to various embodiments, the first housing 210, in the first extension member 212, may include an opening 212*a* (e.g., a through hole) of FIG. 4 disposed in an area corresponding to the camera module 216 and/or the sensor module 217 disposed on the second housing 220 in the case that the electronic device 200 is in a slide-in state. According to an embodiment, the camera module 216 and/or the sensor module 217, in the case that the electronic device 200 is in a slide-in state, may detect the external environment through the opening 212*a* of FIG. 4 formed in the first housing 210. In this case, an area corresponding to at least the camera module 216 and/or the sensor module 217 of the first rear surface cover 213 may be processed to be transparent.

According to various embodiments, the electronic device 200 may include a first printed circuit board 251 and an antenna member 253 disposed between the first extension member 212 and the first rear surface cover 213 in the first housing 210. According to an embodiment, the first printed circuit board 251 and the antenna member 253 may be disposed on at least a portion of the first extension member 212. According to an embodiment, the first printed circuit board 251 and the antenna member 253 may be electrically connected to the second printed circuit board 252 through at least one flexible printed circuit board (e.g., an electrical connection member, a flexible printed circuit board (FPCB) or a flexible RF cable (FRC)). According to an embodiment, the antenna member 253 may include a multi-function coil or multi-function core (MFC) antenna for performing a wireless charging function, a near field communication (NFC) function, and/or an electronic payment function. In some embodiments, the antenna member 253 may be electrically connected to the second printed circuit board 252 through the first circuit board 251 by being connected to the first printed circuit board 251.

Figure 5A:
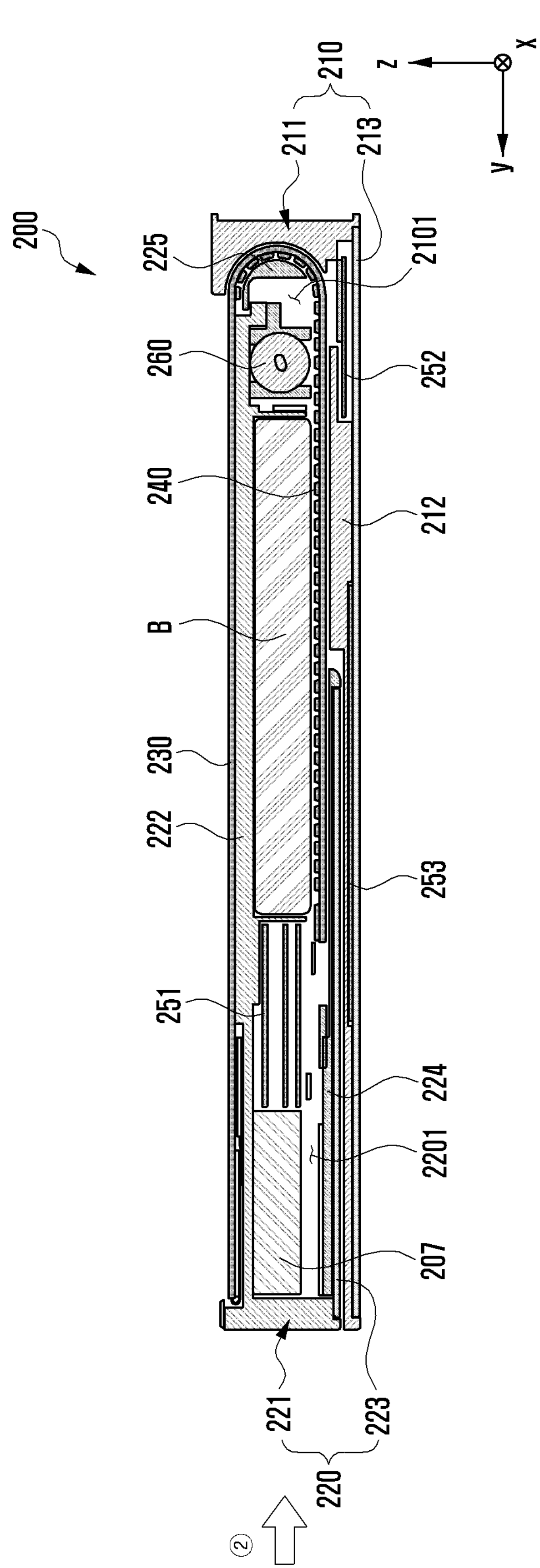
FIG. 5A illustrates a cross-sectional view of an electronic device taken along line 5*a*-5*a* of FIG. 2A according to various embodiments of the present disclosure.
Figure 5B:
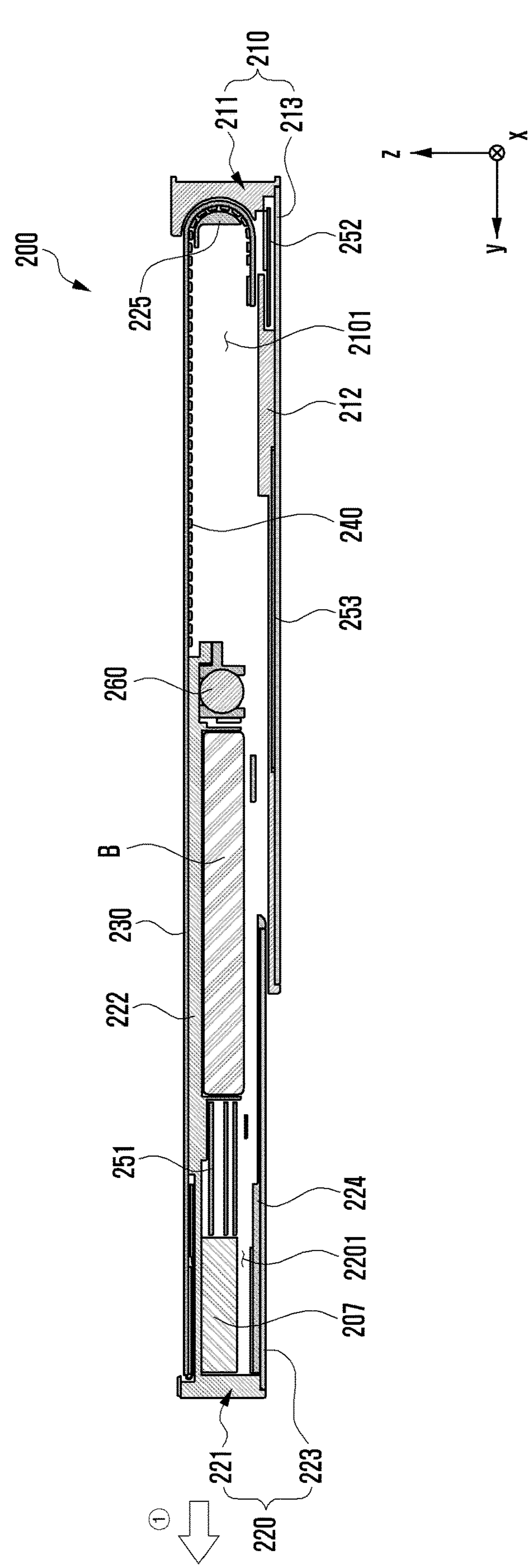
FIG. 5B illustrates a cross-sectional view of an electronic device taken along line 5*b*-5*b* of FIG. 3A according to various embodiments of the present disclosure.

FIG. 5A illustrates a cross-sectional view of an electronic device taken along line 5*a*-5*a* of FIG. 2A according to various embodiments of the present disclosure. FIG. 5B illustrates a cross-sectional view of an electronic device taken along line 5*b*-5*b* of FIG. 3A according to various embodiments of the present disclosure.

In the description of the electronic device of FIGS. 5A and 5B, the same reference numerals are assigned to components that are substantially the same as those of the electronic device of FIG. 4, and detailed descriptions thereof may be omitted.

With reference to FIGS. 5A and 5B, the electronic device 200 may include a first housing 210 having a first space 2101; a second housing 220 having a second space 2201; a support member 240 slidably connected to the first housing 210 and at least partially accommodated in the first space 2101 in a slide-in state; a rollable display 230 disposed to receive support of at least a portion of the support member 240 and at least a portion of the second housing 220; and a driving motor 260 disposed in the second space 2201 and including a pinion gear (e.g., the pinion gear 261 of FIG. 6A) gear-coupled toa rack gear (e.g., the rack gear 2251 of FIG. 6A) of the first space 2101. According to an embodiment, the driving motor 260 may move automatically the second housing 220 relative to the first housing 210 in a slide-in direction (direction ②) or in a slide-out direction (direction ①).

According to various embodiments, in the slide-in state of the electronic device 200 (the state of FIG. 5A), at least a portion of the second housing 220 may be accommodated in the first space 2101 of the first housing 210. According to an embodiment, at least a portion of the second extension member 222 may be slidably coupled and be guided by the support bracket 225 disposed in the first space 2101. In this case, at least a portion of the rollable display 230 may be disposed to be invisible from the outside by being accommodated along with the supporting member 240 in a manner of being bent into the first space 2101. In this case, the first display area of the rollable display 230 may be exposed to the outside.

According to various embodiments, at least a portion of the second housing 220 may transition to a slide-out state exposed to the outside at least partially from the first housing 210 along the first direction (direction ①) by driving the driving motor 260. According to an embodiment, the part slid into the first space 2101 may be at least partially exposed to the outside by the rollable display 230 being supported by the support bracket 225 in the slide-out state of the electronic device 200 (the state of FIG. 5B) and moving together with the support member 240. In this case, the second display area of the rollable display 230, which is larger than the first display area, may be exposed to the outside.

According to various embodiments, the driving motor 260 and electronic components (e.g., the second printed circuit board 252 and the battery B) disposed in the second housing 220 may help improve the operation reliability of the electronic device 200 and the efficient disposition design of electronic components by being moved along with the slide-in/the slide-out operation because the flexible printed circuit board is minimized compared with the disposition structure where the corresponding components are disposed in the first housing 210 and connected through the second printed circuit board 252 and the flexible printed circuit board.

Figure 6A:
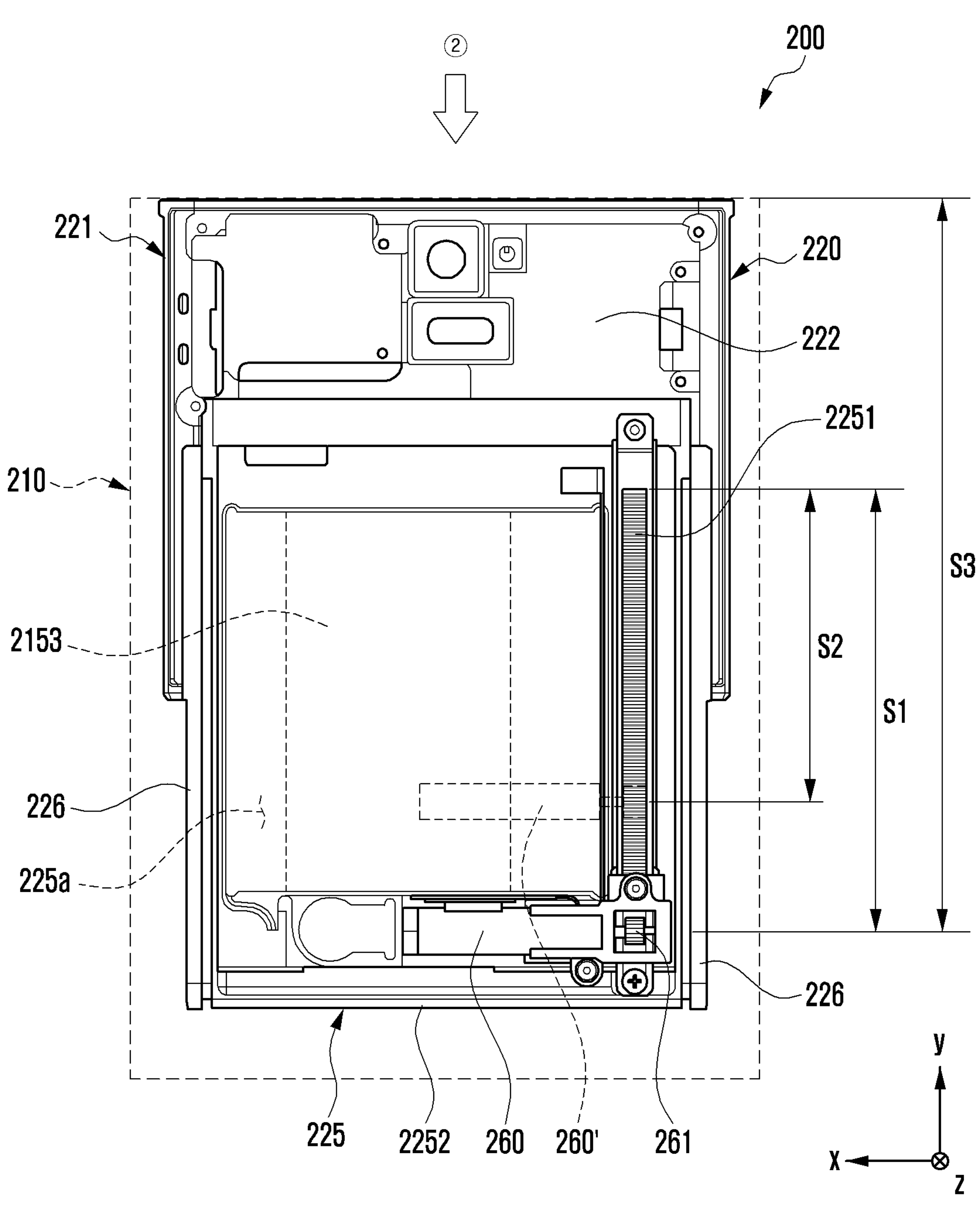
FIGS. 6A and 6B are diagrams illustrating a relationship of a slide stroke in accordance with a disposition of a driving motor in a slide-in/a slide-out state according to various embodiments of the present disclosure.
Figure 6B:
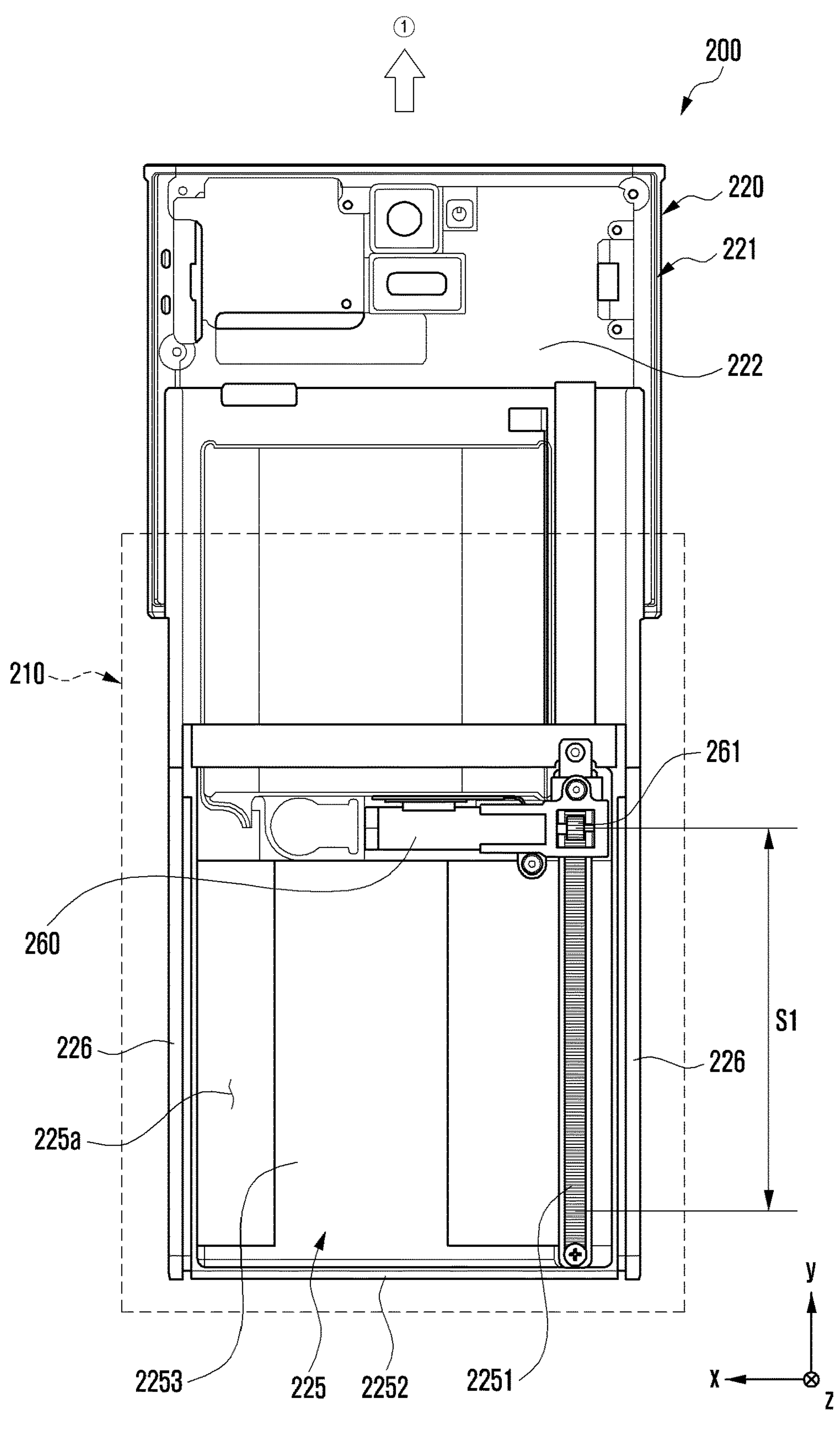

FIGS. 6*a* and 6*b* are diagrams illustrating a relationship of a slide stroke in accordance with a disposition of a driving motor in a slide-in/a slide-out state according to various embodiments of the present disclosure.

With reference to FIGS. 6A and 6B, the electronic device 200 may include a first housing 210 including a first space 2101 and a second housing 220 slidably coupled to the first housing 210. According to an embodiment, the second housing 220 may be disposed to be slid out, relative to the first housing 210, along the first direction (direction ①) (e.g., y-axis direction), or be slid in along the second direction (direction ②(e.g., −y axis direction). For example, the second housing 220 may be disposed to be slidable into a specified slide stroke in the up and down directions (e.g., ±y axis direction) based on the first housing 210 gripped by the user.

According to various embodiments, the electronic device 200 may include a driving motor 260 having a pinion gear 261 disposed in the second housing 220. According to an embodiment, the electronic device 200 may include a rack gear 2251 disposed in the first housing 210 and gear-coupled with the pinion gear 261. According to an embodiment, the rack gear 2251 may be disposed to have a length in a direction parallel to the sliding direction. Accordingly, the slide stroke of the second housing 220 may be determined by the length of the rack gear 2251.

According to various embodiments, the driving motor 260 may be fixed at the end (e.g., the edge) of the first extension member 212 in the slide-in direction (direction ②(e.g., −y axis direction) in the second space 2101. According to an embodiment, the driving motor 260 may be positioned substantially below the electronic device 200 in a slide-in state. Accordingly, the rack gear 2251 disposed on the support bracket 225 may be disposed to have a specified length in a slide-out direction (direction ①) from the lower end of the electronic device 200 in a slide-in state. In this case, the second housing 220 may be moved by a first slide stroke S1 corresponding to the length of the rack gear 2251 through the driving of the driving motor 260. In a comparative example, in the case that the driving motor 260 is located above the bottom of the electronic device 200 in the slide-in state, the second housing 220 may move along a rack gear 2251 having the same length and have a second slide stroke S2 shorter than the first slide stroke S1. This may mean that in the case that the driving motor 260 is disposed at the lower end of the second housing 220, it may have a relatively extended slide stroke S1. According to an embodiment, in the case that the rack gear 2251 is disposed with a length substantially corresponding to the overall length of the first housing 210, a third slide stroke S3 of the second housing 220 moving following this may be more extended than the first slide stroke S1. Accordingly, the electronic device 200 according to exemplary embodiments of the present disclosure may help improve reliability and convenience of the electronic device by providing a user with a relatively expanded display area of the rollable display 230 in a slide-out state through an extension of the slide stroke.

Figure 7:
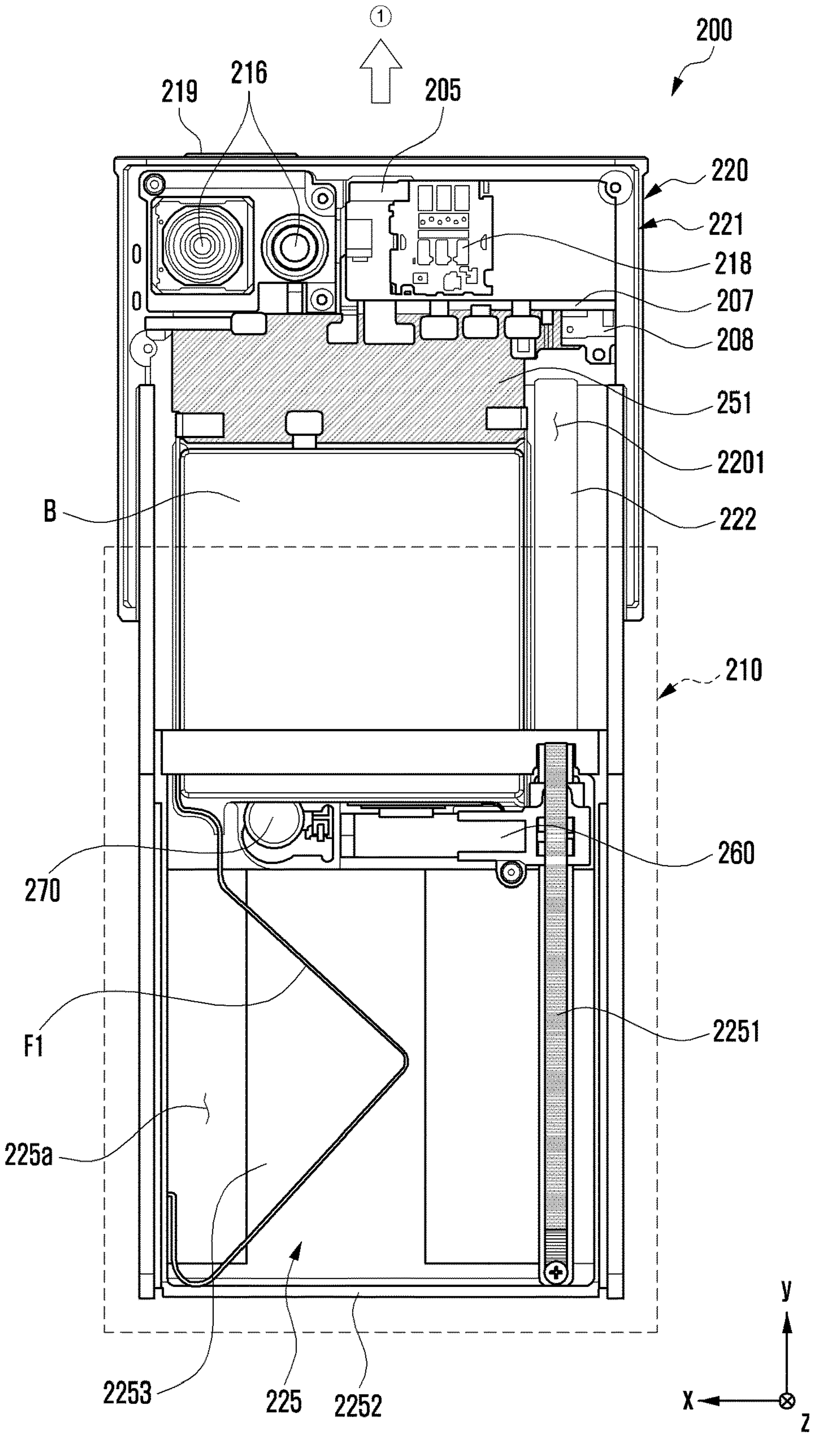
FIG. 7 illustrates a configuration diagram of an electronic device including a flexible printed circuit board according to various embodiments of the present disclosure.

FIG. 7 illustrates a configuration diagram of an electronic device including a flexible printed circuit board according to various embodiments of the present disclosure.

With reference to FIG. 7, the electronic device 200 may include a first housing 210 including a first space 2101 and a second housing 220 slidably coupled to the first housing 210. According to an embodiment, the second housing 220 may be disposed to be slid out, relative to the first housing 210, along the first direction (direction ①(e.g., y-axis direction), or be slid in along the second direction (direction ②(e.g., −y axis direction).

According to various embodiments, the electronic device 200 may include at least one electronic component disposed in the second space 2201 of the second housing 220. According to an embodiment, at least one electronic component may be disposed in a position provided through the second extension member 2222 in the second space 2201 of the second housing 220. According to an embodiment, at least one electronic component may include a second printed circuit board 252, a key button 219 (e.g., a key button including a fingerprint sensor) disposed around the second printed circuit board 252, a camera module 216, a socket module 218 (e.g., a SIM tray), a speaker 207, a connector port 208, or a battery B. According to an embodiment, an efficient electrical connection may be possible because a plurality of electronic components are disposed around the second printed circuit board 252 in the second space 2201 of the second housing 220 together with the driving motor 260. In a comparative example, in the case that electronic components are disposed in the first space 2101, the volume and the number of the flexible printed circuit board F1 (e.g., FPCB) to be electrically connected to the second printed circuit board 252 may be relatively increased. The electronic device 200 may include a vibrator 270 (e.g., a vibration motor) disposed around the driving motor 260 in the second space 2201 of the second housing 220.

According to various embodiments, the electronic device 200 may have one end electrically connected to the second printed circuit board 252 and the other end including a printed circuit board F1 that extends into the first space 2101 of the first housing 220. According to an embodiment, the other end of the flexible printed circuit board F1 may be electrically connected to the first printed circuit board (e.g., the first printed circuit board 251 of FIG. 4) and/or the antenna member (e.g., the antenna member 253 of FIG. 4) after penetrating at least one of the side surfaces (e.g., the first side surface and/or the third side surface of FIG. 2A). In an embodiment, the flexible printed circuit board F1 may electrically connect the second printed circuit board 252 to the first printed circuit board 251 and/or the antenna member 253. According to an embodiment, the flexible printed circuit board F1 may be disposed to have a length or a shape capable of accommodating the slide stroke of the electronic device 200. According to an embodiment, the flexible printed circuit board F1 may be formed of a material or in a shape having elasticity that expands in a slide-out state and returns to its original position in a slide-in state. According to an embodiment, the flexible printed circuit board F1 may include a flexible printed circuit board (FPCB) or a flexible RF cable (FRC).

Figure 8A:
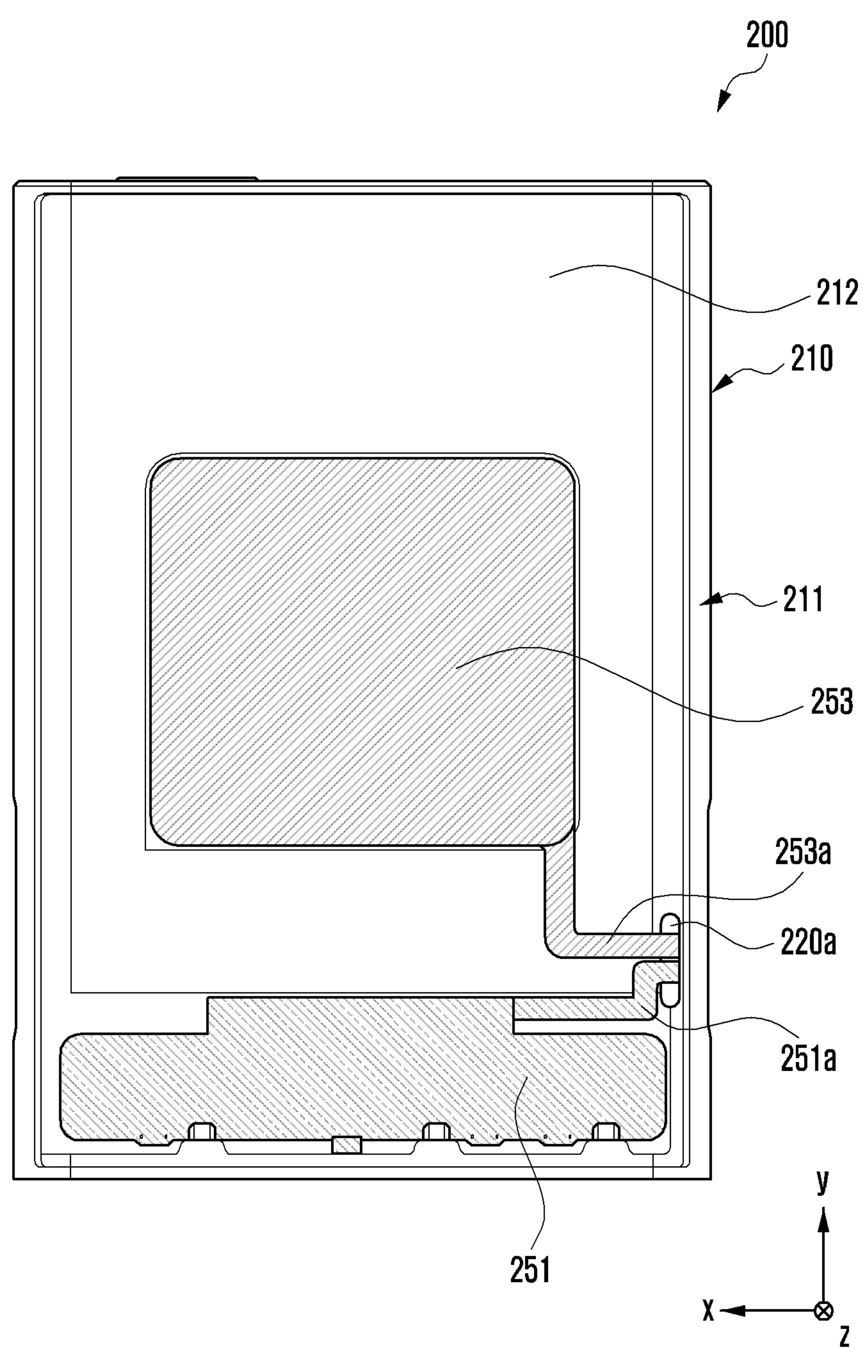
FIGS. 8A and 8B are configuration diagrams of an electronic device illustrating a disposition structure of an antenna member and a first printed circuit board according to various embodiments of the present disclosure.
Figure 8B:
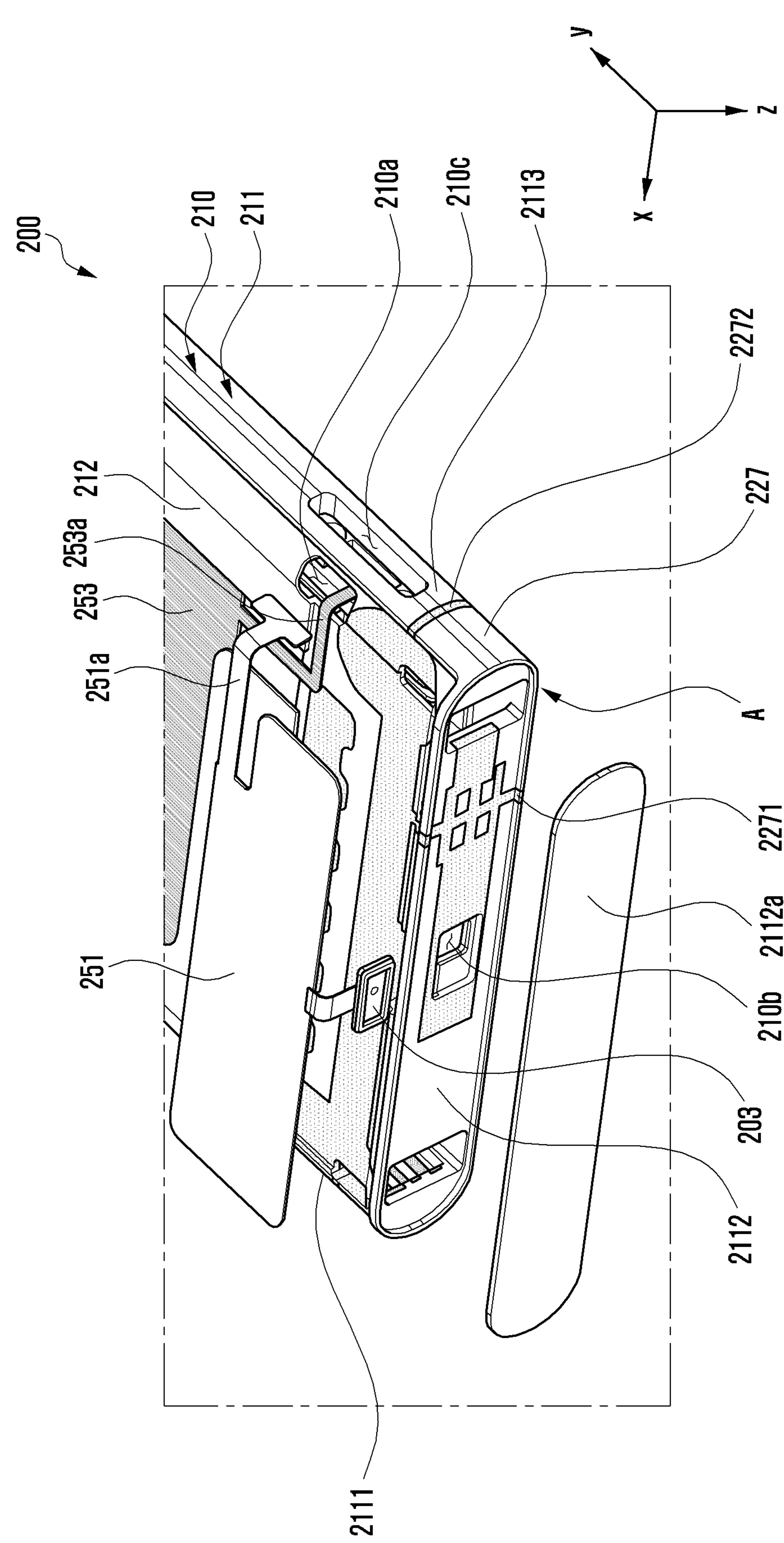

FIGS. 8A and 8B are configuration diagrams of an electronic device illustrating a disposition structure of an antenna member and a first printed circuit board according to various embodiments of the present disclosure.

With reference to FIGS. 8A and 8B, the electronic device 200 may include a first printed circuit board 251 and an antenna member 253 disposed in a space between the first extension member 212 and the first rear surface cover 213. According to an embodiment, the antenna member 253 may include a coil member disposed through a dielectric film. According to an embodiment, the antenna member 253 may include a multi-function coil or multi-function core (MFC) antenna for performing a wireless charging function, a near field communication (NFC) function, and/or an electronic payment function. According to an embodiment, the first printed circuit board 251 may be disposed in a manner to be electrically connected to the flexible printed circuit board (the flexible printed circuit board F1 of FIG. 7) disposed in the first space 2101 after the connector part 251*a* extending from the first printed circuit board 251 is penetrated through the hole 210*a* formed in the first extension member 212. According to an embodiment, the antenna member 253 also may be disposed in a manner to be electrically connected to the flexible printed circuit board disposed in the first space 2101 after the connector part 253*a* extending from the antenna member 253 is penetrated through the first through hole 210*a*. In some embodiments, the first printed circuit board 251 and the antenna member 253 may be disposed to be electrically connected to the flexible printed circuit board F1 in the first space 2101 after being penetrated through different respective through holes disposed on the first extension member 212.

According to various embodiments, the electronic device 200 may include a microphone 203 as an input device that extends from the first printed circuit board 2511 and is disposed through the second through hole 210*b* formed in the second side surface 2112 of the first housing 210. According to an embodiment, the first housing 210 may include a third through hole 210*c* disposed on the first side surface 2111 and/or the third side surface 2113. The third through hole 210*c* may be used as a fastening path to fasten a guide rail (e.g., the guide rail 226 of FIG. 4) to a support bracket (e.g., the support bracket 225 of FIG. 4) through a fastening member such as a screw through the third through hole 210*c* by being formed in a manner to connect the first space 2101 from the outside.

Figure 9:
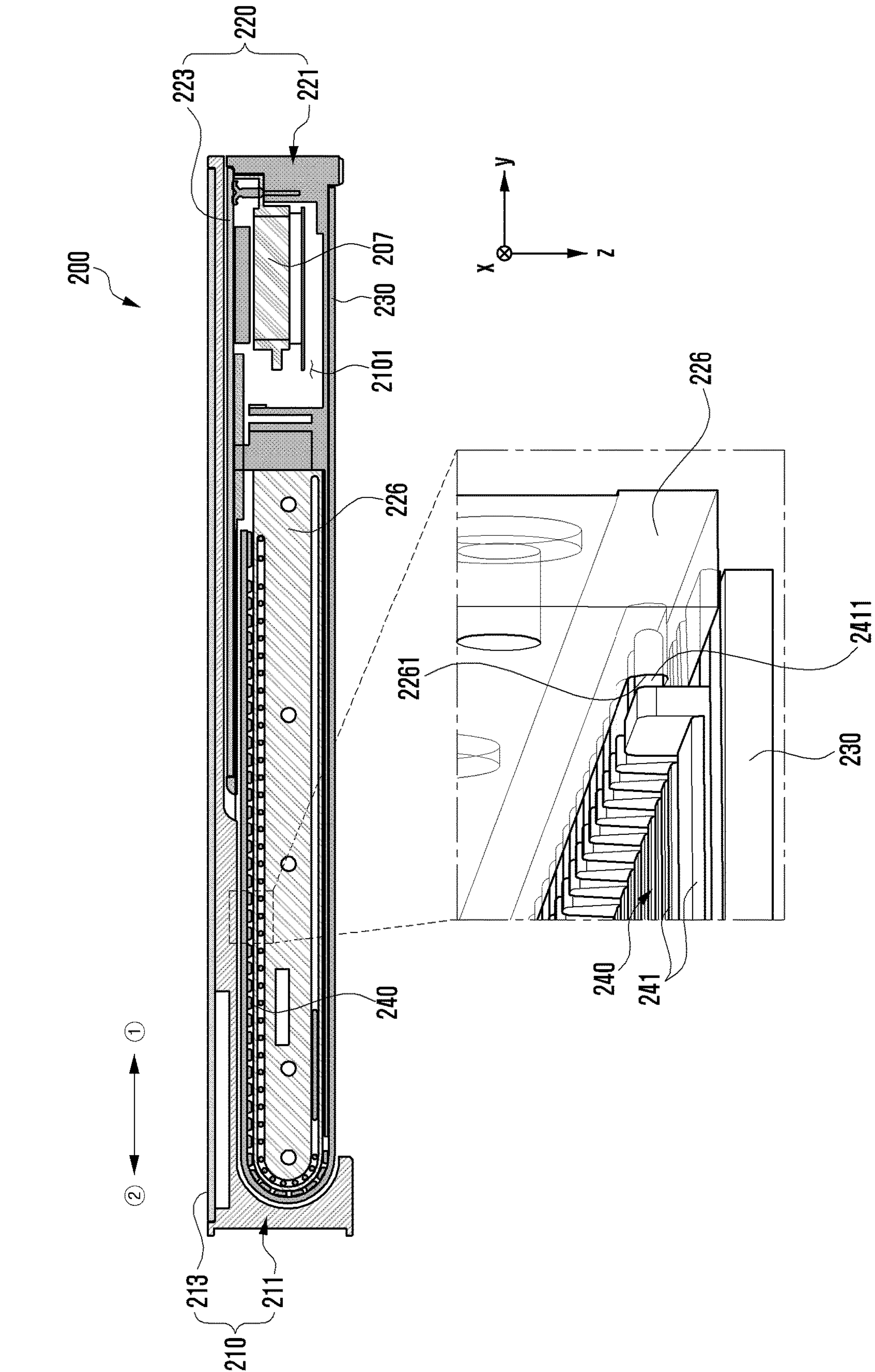
FIG. 9 is illustrates cross-sectional view of an electronic device including a guide structure according to various embodiments of the present disclosure.

FIG. 9 illustrates a cross-sectional view of an electronic device including a guide structure according to various embodiments of the present disclosure.

With reference to FIG. 9, the electronic device 200 may include a support member 240 for supporting the rollable display 230 and a pair of guide rails 226 for guiding both ends of the support member 240. According to an embodiment, the support member 240 may include a plurality of multi-bars 241 rotatably coupled to each other and guide protrusions 2411 protruding from both ends of each of the multi-bars 241. According to an embodiment, the guide rail 226 may be fixed to both side surfaces of the support bracket 225 disposed in the first space 2101 of the first housing 210. According to an embodiment, the guide rail 226 may include a guide slit 2261 formed at a position corresponding to the movement trajectory of the support member 240. According to an embodiment, in the case that the support member 240 fixed in a manner of attaching to the rear surface of the rollable display 230 is movably coupled to the guide rail 226, the guide structure in which the guide protrusion 2411 is moved along a guide slit 2611 may help reduce a phenomenon that the rollable display 230 is detached or deformed during operation.

Figure 10:
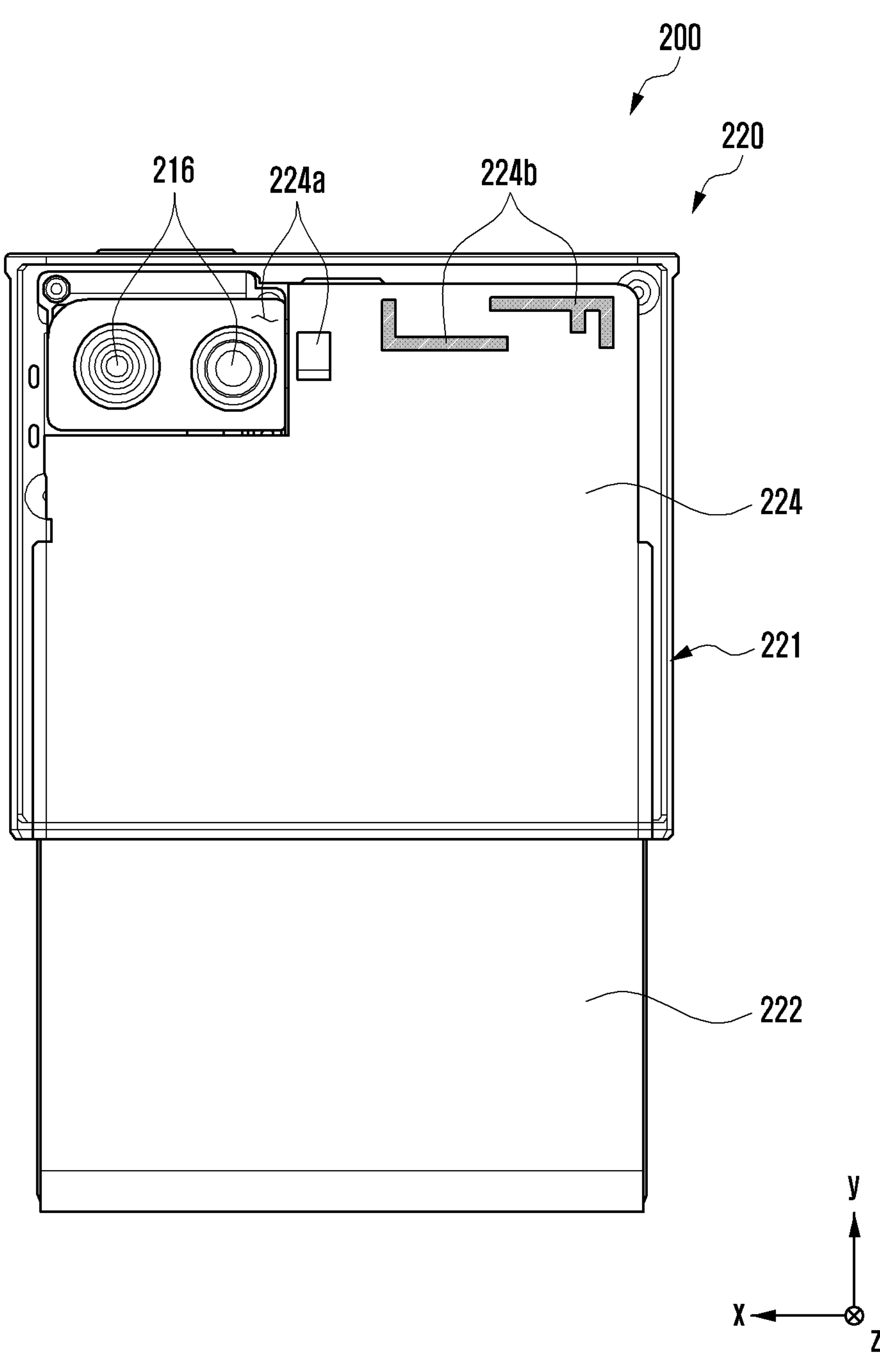
FIG. 10 is illustrates configuration diagram of an electronic device including a rear bracket according to various embodiments of the present disclosure.

FIG. 10 illustrates a configuration diagram of an electronic device including a rear bracket according to various embodiments of the present disclosure.

With reference to FIG. 10, the second housing 220 may include a rear bracket 224 disposed between the second extension member 222 and the second rear surface cover (e.g., the second rear surface cover 223 of FIG. 4). According to an embodiment, the rear bracket 224 may be disposed in a manner that it is coupled with at least a portion of the second extension member 222. According to an embodiment, in the case that the rear bracket 224 is formed of an injection product (e.g., an antenna carrier) of a dielectric material, it may include at least one antenna element 224*b* disposed on an outer surface. According to an embodiment, at least one antenna element 224*b* may include a laser direct structuring (LDS) antenna pattern formed on an outer surface of the rear bracket 224. In some embodiments, at least one antenna element 224*b* may include a conductive plate attached to the outer surface of the rear bracket 224, or a conductive paint or conductive pattern formed on the outer surface. In some embodiments, at least one antenna element 224*b* may be disposed in an embedded manner in the case that the rear bracket 224 is ejected. According to an embodiment, at least one antenna element 224*b* may be configured to transmit or receive radio signals in a designated frequency band (e.g., the legacy band) by being electrically connected to a wireless communication circuit (e.g., the wireless communication module 192 of FIG. 1) disposed on the second printed circuit board 252.

Figure 11A:
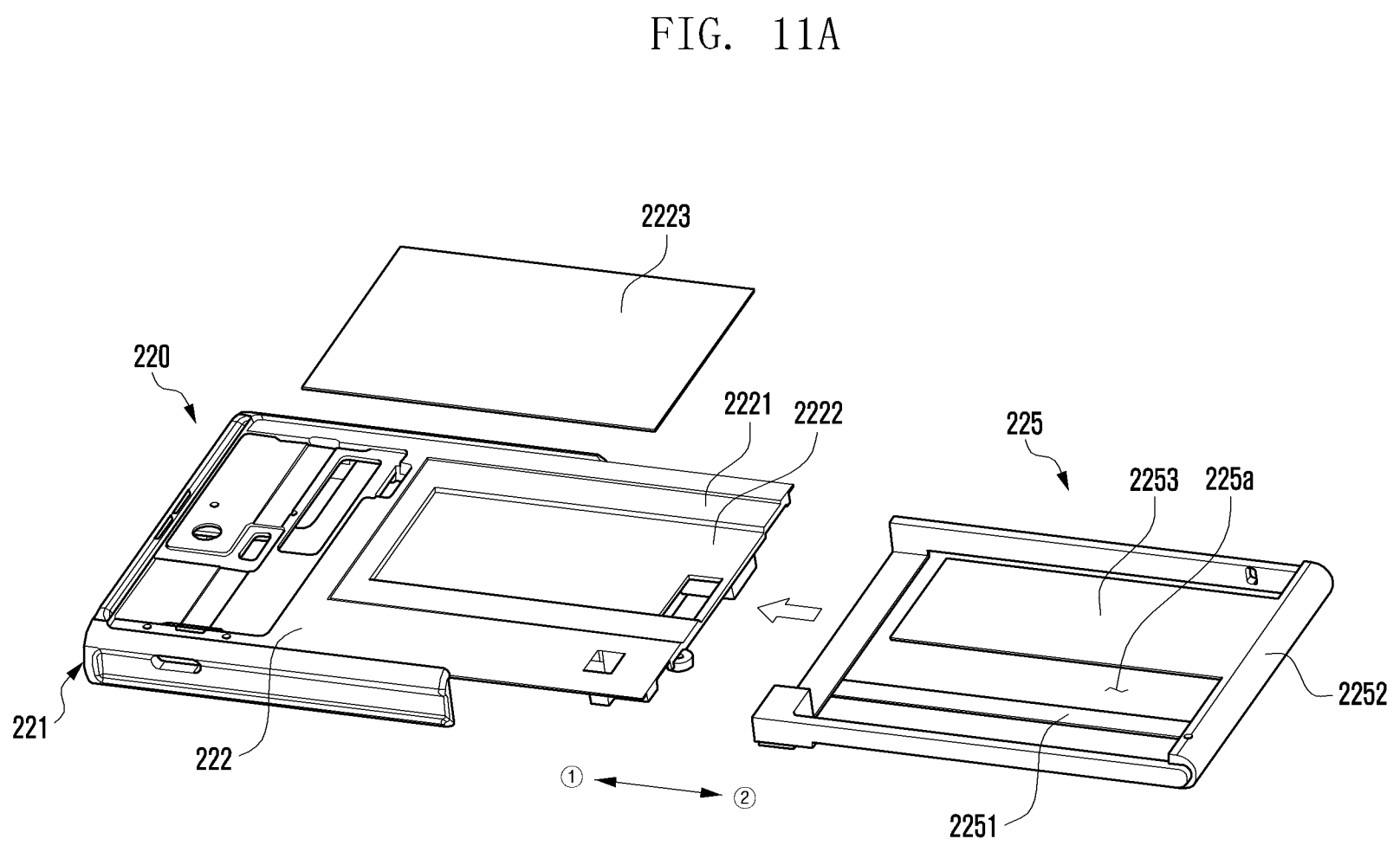
Figure 11B:
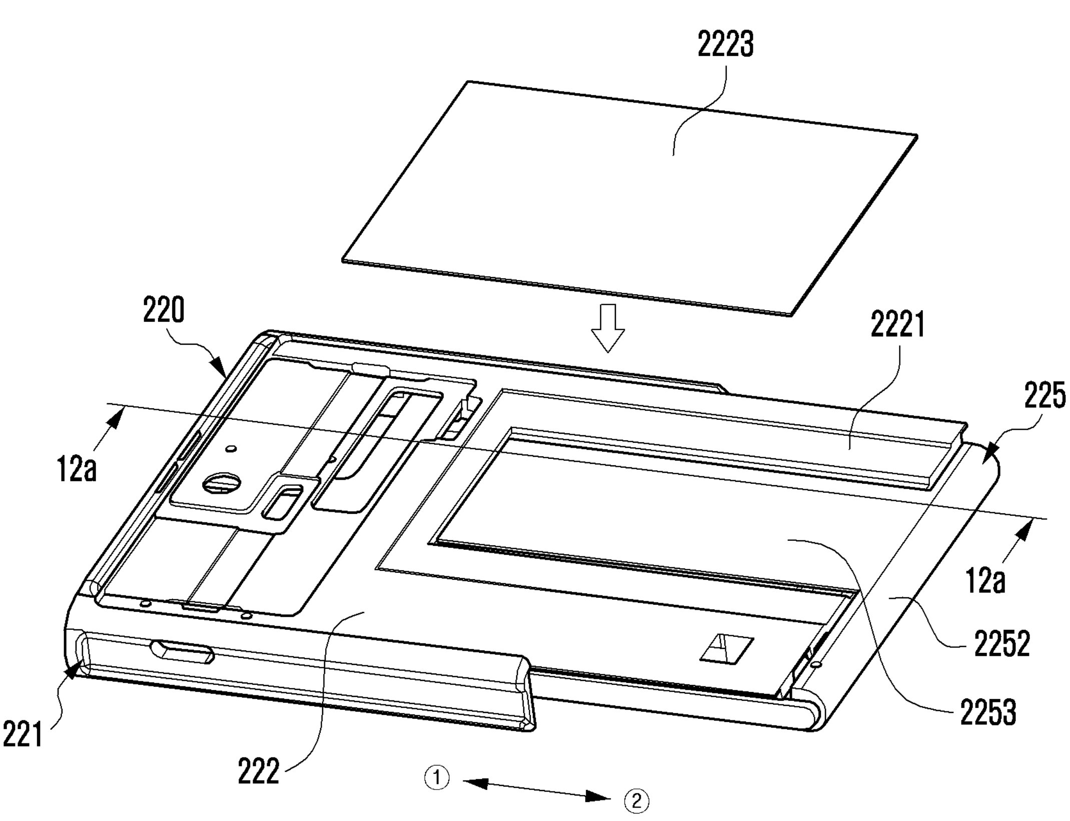
Figure 12A:
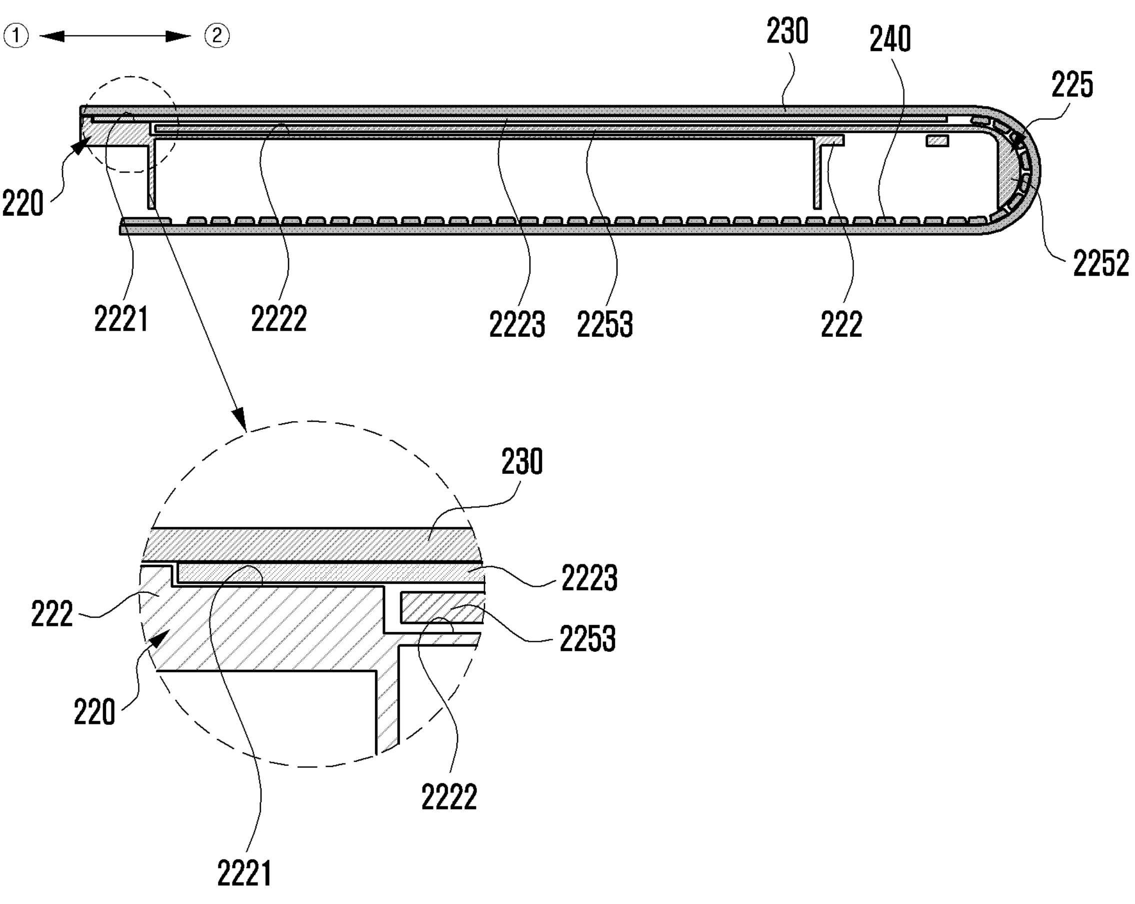
FIG. 12A is a cross-sectional view illustrating a coupled state of a first housing and a support bracket in a slide-in state as viewed along line 12*a*-12*a* of FIG. 11*b* according to various embodiments of the present disclosure.
Figure 12B:
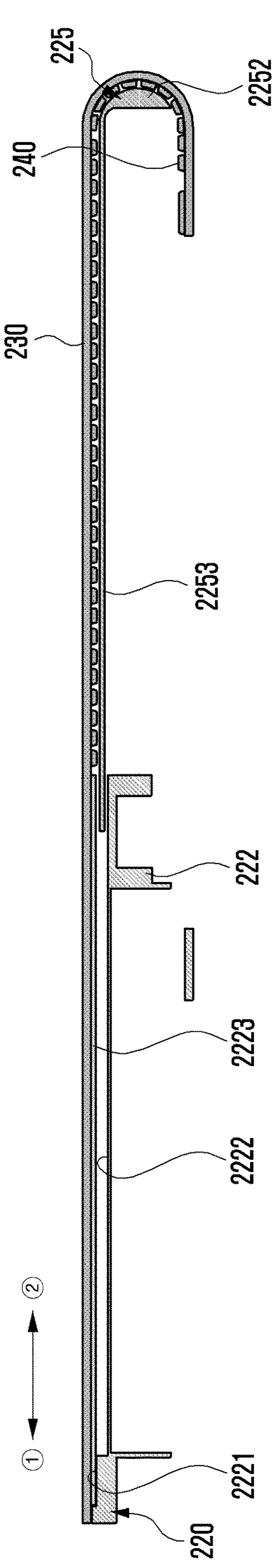
FIG. 12B is a cross-sectional view illustrating a coupled state of the first housing and the support bracket in a slide-out state according to various embodiments of the present disclosure.

FIGS. 11A and 11B are diagrams illustrating a support structure for a rollable display according to various embodiments of the present disclosure. FIG. 12A is a cross-sectional view illustrating a coupled state of a first housing and a support bracket in a slide-in state as viewed along line 12*a*-12*a* of FIG. 11B according to various embodiments of the present disclosure. FIG. 12B is a cross-sectional view illustrating a coupled state of the first housing and the support bracket in a slide-out state according to various embodiments of the present disclosure.

With reference to FIGS. 11A to 12B, the electronic device 200 may include a display support structure configured to support at least a portion of the support member 240 in a slide-out state. According to an embodiment, the second housing 220 may include a first recess 2221 formed in the second extension member 222 and a second recess 2222 formed in the first recess 2221. According to an embodiment, the first recess 2221 and the second recess 2222 may be formed as open in the direction of one edge (e.g., the edge in the direction of the support bracket) of the second extension member 222. According to an embodiment, the second housing 220 may include a support cover 2223 attached to the first recess 2221 in the second extension member 222. According to an embodiment, in the case that the support cover 2223 is attached to the first recess 2221, it may support without deterioration in surface quality of the rollable display 230 by forming substantially the same plane as the outer surface of the second extension member 222.

According to various embodiments, the support bracket 225 may include a support plate 2253 extending from the support part 2252 to the opening 225*a*. According to an embodiment, in the case that the support bracket 225 is slidably coupled to the second extension member 222 of the second housing 220, the support plate 2253 may have a coupling structure slidably accommodated in the space between the support cover 2223 and the second recess 2222. According to an embodiment, the support plate 2253 may help improve the surface quality of the rollable display 230 by supporting the rear surface of the support member 240 to reduce the sagging of the support member 240 through the opening 225*a* in the slide-out state. For example, the support cover 2223 may support the rollable display 230 without bends or steps by forming the same plane as the support member 240 even in a slide-out state through being formed to have substantially the same thickness as that of the support member 240.

According to various embodiments, an electronic device (e.g., the electronic device 200 of FIG. 3A) may include a first housing (e.g., the first housing 210 of FIG. 3A); a second housing (e.g., the second housing 220 in FIG. 3A) slidably coupled to the first housing; a rollable display (e.g., the rollable display 230 in FIG. 3A) that is disposed to be supported by the first housing and the second housing and of which a display area is reduced or expanded based on slide-in or slide-out of the second housing; a support member (e.g., the support member 240 of FIG. 4) disposed on the rear surface of the rollable display to support at least a portion of the rollable display; a first printed circuit board (e.g., the first printed circuit board 251 of FIG. 4) disposed on the first housing; a second printed circuit board (e.g., the second printed circuit board 252 of FIG. 4) disposed on the second housing; a flexible printed circuit board (e.g., the flexible printed circuit board F1 of FIG. 7) that connects the first printed circuit board and the second printed circuit and is folded or unfolded based on the slide-in or the slide-out of the second housing; a driving motor (e.g., the driving motor 260 of FIG. 4) disposed on the second housing and providing a driving force to drive the second housing; a battery (e.g., battery B in FIG. 4) disposed on the second housing and supplying power to the driving motor; a pinion gear (e.g., the pinion gear 261 of FIG. 6A) disposed on the second housing and transmitting power based on a driving force of the driving motor; and a rack gear (e.g., rack gear 2251 of FIG. 6A) disposed on the first housing and gear-coupled with the pinion gear.

According to various embodiments, the slide stroke of the second housing may be determined in accordance with the disposition length of the rack gear.

According to various embodiments, at least one electronic component may include a second printed circuit board and a battery electrically connected to the second printed circuit board.

According to various embodiments, the rack gear may be disposed to have a length in a direction parallel to the first direction.

According to various embodiments, at least one electronic component may include at least one of a battery, a board, at least one camera module, a speaker, a microphone, a socket module, a connector module, a key button, or at least one sensor module.

According to various embodiments, the driving motor may be disposed at an edge of the first housing in the second direction opposite to the first direction.

According to various embodiments, an electronic device (e.g., the electronic device 200 of FIG. 4) may include a first housing (e.g., the first housing of FIG. 4) including a first space (e.g., the first space 2101 of FIG. 4) formed through a first lateral member (e.g., the first lateral member 211 of FIG. 4) and a first printed circuit board (e.g., the first printed circuit board 251 of FIG. 4) disposed in the first space; a second housing (e.g., the second housing 220 of FIG. 4) slidably coupled to the first housing and including a second printed circuit board (e.g., the second printed circuit board 252 of FIG. 4) disposed in a second space (e.g., the second space 2201 of FIG. 4) formed through a second lateral member (e.g., the second lateral member 221 of FIG. 4); a rear surface cover (e.g., the rear surface cover 213 of FIG. 4) disposed on an outer surface of the first lateral member; at least one electronic component (e.g., the antenna member 253 of FIG. 4) disposed between the first lateral member and the rear surface cover; a rollable display (e.g., the rollable display 230 of FIG. 4) that is disposed to be supported by the first housing and the second housing and of which a display area is expanded in the case of transitioning from a slide-in state where at least a portion of the second housing is accommodated in the first space to a slide-out state where moving in a first direction; a driving motor (e.g., the driving motor 260 of FIG. 4) disposed on the second space, connected electrically to at least one electronic component and including a pinion gear (e.g., the pinion gear 261 of FIG. 6A); and a rack gear (e.g., the rack gear 2251 of FIG. 6A) disposed on the first space and gear-coupled with the pinion gear, wherein at least one electronic component may be connected electrically to the second printed circuit board through an expandable flexible printed circuit board (e.g., the flexible printed circuit board F1 of FIG. 7) that is extended to the second space from the first printed circuit board.

According to various embodiments, at least one electronic component may be electrically connected to the expandable flexible printed circuit board disposed in the first space through a through hole formed in at least a part of the first lateral member.

According to various embodiments, at least one electronic component may include a first printed circuit board and/or an antenna member.

According to various embodiments, the expandable flexible printed circuit board may include a flexible printed circuit board (FPCB) or a flexible RF cable (FRC).

According to various embodiments, the driving motor may be disposed at an edge of the second lateral member in the second direction opposite to the first direction.

According to various embodiments, an electronic device (e.g., the electronic device 200 of FIG. 4) may include a first housing (e.g., the first housing 210 of FIG. 4) including a first space (e.g., the first space 2101 of FIG. 4) in which a first extension member (e.g., the first extension member 212 of FIG. 4) is disposed; a second housing (e.g., the second housing 220 of FIG. 4) slidably coupled to the first housing and including a second space (e.g., the second space 2201 of FIG. 4); a support bracket (e.g., the support bracket 225 of FIG. 4) disposed in the first space; a rollable display (e.g., the rollable display 230) that is disposed to be supported by the first housing and the second housing and of which a display area is expanded in the case of transitioning from a slide-in state where at least a portion of the second housing is accommodated in the first space to a slide-out state where moving in a first direction; at least one electronic component disposed in the second space; a driving motor (e.g., the driving motor 260 of FIG. 4) disposed on the second space, connected electrically to at least one electronic component and including a pinion gear (e.g., the pinion gear 261 of FIG. 6A); and a rack gear (e.g., the rack gear 2251 of FIG. 6A) disposed on the first space and gear-coupled with the pinion gear, wherein the support bracket includes a support part (e.g., the support part 2252 of FIG. 4) of which the outer surface is formed in curve to support at least a portion of the support member and a support plate (e.g., the support plate 2253 of FIG. 4) extending from the support part toward the second housing, wherein the support plate is formed to support at least a portion of the support member in the slide-out state.

According to various embodiments, the support plate may be slidably coupled to at least a portion of the second extension member.

According to various embodiments, the second extension member may include at least one recess for accommodating the support plate and a support cover covering the at least one recess to form substantially the same plane as an outer surface of the support plate, and the support plate may be accommodated in a space between the at least one recess and the support cover in the slide-in state.

According to various embodiments, the support cover, in the slide-out state, may be formed to have a thickness substantially the same as that of the support member.

According to various embodiments, the driving motor may be disposed at an edge of the second lateral member in the second direction opposite to the first direction.

According to various embodiments, an electronic device (e.g., the electronic device 200 of FIG. 4) may include a first housing (e.g., the first housing 210 of FIG. 4) including a first lateral member (e.g., the first lateral member 211 of FIG. 4) and a first extension member (e.g., the first extension member 212 of FIG. 4) extending from the first lateral member to a first space (e.g., the first space 2101 of FIG. 4); a second housing (e.g., the second housing 220 of FIG. 4) slidably coupled to the first housing and including a second lateral member (e.g., the second lateral member 221 of FIG. 4) and a second extension member (e.g., the second extension member 222 of FIG. 4) extending from the second lateral member to a second space (e.g., the second space 2201 of FIG. 4); a rollable display (e.g., the rollable display 230 of FIG. 4) that is disposed to be supported by the first housing and the second housing and of which a display area is expanded in the case of transitioning from a slide-in state where at least a portion of the second housing is accommodated in the first space to a slide-out state where moving in a first direction; at least one electronic component disposed in the second space; a driving motor (e.g., the driving motor 260 of FIG. 4) disposed on at least a portion of the second extension member, connected electrically to at least one electronic component and including a pinion gear (e.g., the pinion gear 261 of FIG. 4); and a rack gear (e.g., the rack gear 2251 of FIG. 6A) disposed through the first extension member and gear-coupled with the pinion gear, wherein the driving motor may be disposed at an edge of the first extension member in the second direction opposite to the first direction.

According to various embodiments, the first lateral member and the second lateral member may at least partially form the appearance of the electronic device.

According to various embodiments, at least a portion of the second lateral member may be accommodated in the first space not to be at least partially visible from the outside in the slide-in state.

According to various embodiments, the rack gear may be disposed to have a length in a direction parallel to the first direction, and the slide stroke of the second housing may be determined according to the length of the rack gear.

Also, embodiments disclosed in the specification and drawings of this document are merely presented as specific examples to easily explain the technical content according to the embodiments of the disclosure and help an understanding of the embodiments of the disclosure, but they are not intended to limit the scope of the embodiments of the disclosure. Therefore, all changes or modifications derived from the technical ideals of the various embodiments of the disclosure should be interpreted to be included in the scope of the various embodiments of the disclosure in addition to the embodiments disclosed in the present document.

The invention claimed is:

1. An electronic device comprising:

a first housing;

a second housing slidably coupled to the first housing;

a rollable display that is disposed to be supported by the first housing and the second housing and of which a display area is reduced or expanded based on sliding-in or sliding-out of the second housing;

a support member disposed on a rear surface of the rollable display to support at least a portion of the rollable display;

a first printed circuit board disposed in the first housing;

a second printed circuit board disposed in the second housing;

a flexible printed circuit board that is configured to connect the first printed circuit board and the second printed circuit board and is configured to be folded or unfolded based on the sliding-in or the sliding-out of the second housing;

a driving motor disposed in the second housing and configured to provide a driving force for driving the second housing;

a battery disposed in the second housing and configured to supply power to the driving motor;

a pinion gear disposed in the second housing and configured to transmit power based on the driving force of the driving motor; and a rack gear disposed in the first housing and gear-coupled with the pinion gear.

2. The electronic device of claim 1, wherein a slide stroke of the second housing is determined in accordance with a disposition length of the rack gear.

3. The electronic device of claim 1, wherein the electronic device further includes at least one electronic component including the second printed circuit board and the battery electrically connected to the second printed circuit board.

4. The electronic device of claim 1, wherein the rack gear is disposed to have a length in a direction parallel to a first direction, wherein the first direction is a direction in which the display area of the rollable display is expanded.

5. The electronic device of claim 1, wherein the electronic device further includes at least one electronic component including at least one of the battery, the first printed circuit board, the second printed circuit board, the flexible printed circuit board, at least one camera module, a speaker, a microphone, a socket module, a connector module, a key button, and at least one sensor module.

6. The electronic device of claim 1, wherein the driving motor is disposed at an edge of the first housing in a direction opposite to a first direction, wherein the first direction is a direction in which the display area of the rollable display is expanded.

7. An electronic device comprising:

a first housing including a first space formed through a first lateral member and a first printed circuit board disposed in the first space;

a second housing slidably coupled to the first housing and including a second printed circuit board disposed in a second space formed through a second lateral member;

a rear surface cover disposed on an outer surface of the first lateral member;

at least one electronic component disposed between the first lateral member and the rear surface cover;

a rollable display that is disposed to be supported by the first housing and the second housing and of which a display area is expanded in the case of transitioning from a slide-in state where at least a portion of the second housing is accommodated in the first space to a slide-out state where the second housing is moving in a first direction, wherein the first direction is a direction in which the display area of the rollable display is expanded;

a driving motor disposed in the second space, connected electrically to the at least one electronic component and including a pinion gear; and a rack gear disposed in the first space and gear-coupled with the pinion gear, wherein the at least one electronic component is connected electrically to the second printed circuit board through an expandable flexible printed circuit board that is extended into the second space from the first printed circuit board.

8. The electronic device of claim 7, wherein the at least one electronic component is electrically connected to the expandable flexible printed circuit board disposed in the first space through a through hole formed in at least a portion of the first lateral member.

9. The electronic device of claim 7, wherein the at least one electronic component includes the first printed circuit board and/or an antenna member.

10. The electronic device of claim 1, wherein the expandable flexible printed circuit board includes a flexible printed circuit board (FPCB) or a flexible RF cable (FRC).

11. The electronic device of claim 1, wherein the driving motor is disposed at an edge of the second lateral member in a direction opposite to the first direction.

12. An electronic device comprising:

a first housing including a first space in which a first extension member is disposed;

a second housing slidably coupled to the first housing and including a second space;

a support bracket disposed in the first space;

a rollable display that is disposed to be supported by the first housing and the second housing and of which a display area is expanded in the case of transitioning from a slide-in state where at least a portion of the second housing is accommodated in the first space to a slide-out state where the second housing is moving in a first direction, wherein the first direction is a direction in which the display area of the rollable display is expanded;

at least one electronic component disposed in the second space;

a driving motor disposed in the second space, connected electrically to at least one electronic component and including a pinion gear; and a rack gear disposed on the first space and gear-coupled with the pinion gear, wherein the support bracket includes a support part of which an outer surface is formed in a curve to support at least a portion of a support member and a support plate extending from the support part toward the second housing, wherein the support plate is formed to support at least a portion of the support member in the slide-out state.

13. The electronic device of claim 12, wherein the support plate is slidably coupled to at least a portion of a second extension member.

14. The electronic device of claim 13, wherein the second extension member includes at least one recess for receiving the support plate and a support cover covering the at least one recess to form substantially the same plane as an outer surface of the support plate, wherein the support plate is accommodated in a space between the at least one recess and the support cover in the slide-in state.

15. The electronic device of claim 14, wherein the support cover is formed to have a thickness substantially the same as that of the support member in the slide-out state.

* * * * *